United States Patent
Lin et al.

(10) Patent No.: US 11,979,283 B2
(45) Date of Patent: May 7, 2024

(54) STACKING-PORT CONFIGURATION USING ZERO-TOUCH PROVISIONING

(71) Applicant: ARRIS Enterprises LLC, Suwanee, GA (US)

(72) Inventors: Kwun Nan Lin, Saratoga, CA (US); Ling Yang, Pleasanton, CA (US); Vignesh Hariharan, Fremont, CA (US); Robin S Wong, Alamo, CA (US)

(73) Assignee: Rvckus IP Holdings LLC, Claremont, NC (US)

( * ) Notice: Subject to any disclaimer, the term of this patent is extended or adjusted under 35 U.S.C. 154(b) by 152 days.

(21) Appl. No.: 17/124,799

(22) Filed: Dec. 17, 2020

(65) Prior Publication Data

US 2021/0211351 A1 Jul. 8, 2021

Related U.S. Application Data

(60) Provisional application No. 62/958,272, filed on Jan. 7, 2020.

(51) Int. Cl.
*H04L 41/082* (2022.01)
*H04L 12/423* (2006.01)
(Continued)

(52) U.S. Cl.
CPC .......... *H04L 41/082* (2013.01); *H04L 12/423* (2013.01); *H04L 41/0661* (2023.05);
(Continued)

(58) Field of Classification Search
CPC . H04L 41/082; H04L 12/423; H04L 41/0672; H04L 41/0886; H04L 49/30;
(Continued)

(56) References Cited

U.S. PATENT DOCUMENTS

| 11,706,146 B1* | 7/2023 | Joliveau | H04L 45/02 370/230 |
| 2004/0218540 A1* | 11/2004 | Foschiano | H04L 45/02 370/241 |

(Continued)

FOREIGN PATENT DOCUMENTS

WO 2014169855 A1 10/2014

OTHER PUBLICATIONS

"Extended European Search Report for European Application No. 21150505.2, dated May 31, 2021, 8 pages".

*Primary Examiner* — Hitesh Patel
(74) *Attorney, Agent, or Firm* — Steven Stupp

(57) ABSTRACT

An electronic device includes multiple networking devices arranged in a stack. The networking devices may include configurable ports, where a given configurable port in the configurable ports may be configured as a data port or a stacking port. During operation, a networking device in the stack may be designated as a master in the stack. In response, the networking device may provide one or more probe messages to determine a state of the networking devices, where the state includes one or more connections among the networking devices. Then, the networking device may verify that the one or more connections are correct. When the one or more connections are correct, the networking device may define a subset of the configurable ports in the networking devices as stacking ports.

17 Claims, 22 Drawing Sheets

(51) Int. Cl.
*H04L 41/0659* (2022.01)
*H04L 41/08* (2022.01)
*H04L 49/00* (2022.01)
*H04L 12/42* (2006.01)

(52) U.S. Cl.
CPC .......... *H04L 41/0886* (2013.01); *H04L 49/30* (2013.01); *H04L 2012/421* (2013.01)

(58) Field of Classification Search
CPC ... H04L 2012/421; H04L 45/22; H04L 45/28; H04L 45/00; H04L 65/752; H04L 45/16; H04L 45/02; H04L 47/10; H04L 45/64; H04L 45/70; H04L 45/34; H04L 43/0811
See application file for complete search history.

(56) References Cited

U.S. PATENT DOCUMENTS

| | | |
|---|---|---|
| 2006/0227715 A1 | 10/2006 | Baird et al. |
| 2006/0259595 A1 | 11/2006 | Talayco |
| 2010/0169446 A1* | 7/2010 | Linden .................. G06F 11/181 709/224 |
| 2013/0215791 A1* | 8/2013 | Lin ....................... H04L 49/351 370/254 |
| 2014/0341079 A1 | 11/2014 | Lin et al. |
| 2016/0119183 A1* | 4/2016 | Gopalarathnam ...... H04L 41/30 370/254 |
| 2017/0331676 A1* | 11/2017 | Chen .................. H04L 41/0654 |
| 2019/0296966 A1* | 9/2019 | Gao ........................ H04L 45/66 |
| 2020/0244533 A1* | 7/2020 | Gopalarathnam .. H04L 41/0886 |
| 2021/0406191 A1* | 12/2021 | Radi ................... G06F 12/0891 |

* cited by examiner

STACKING-PORT CONFIGURATION USING ZERO-TOUCH PROVISIONING

CROSS REFERENCE TO RELATED APPLICATIONS

This application claims priority under 35 U.S.C. 119(e) to U.S. Provisional Application Ser. No. 62/958,272, entitled "Stacking-Port Configuration Using Zero-Touch Provisioning," by Kwun Nan Lin, Ling Yang, Vignesh Harihavan and Robin S. Wong, filed on Jan. 7, 2020, the contents of both of which are herein incorporated by reference.

BACKGROUND

Field

The described embodiments relate to techniques for communicating information among electronic devices, including automatically configuring stacking ports in a stack of networking devices (such as switches and/or routers).

Related Art

Many networks include switches or routers that direct packets or frames to their destinations. In some implementations, the data planes of the switches or routers (which are sometimes referred to as 'networking devices') are stacked together or combined into a common logical unit. In this stacked configuration, an active controller in a control or management plane in the stacked switches or routers may control the stacked switches or routers.

For example, stacked switches or routers may be connected by stacking ports that provide an internal switching fabric for the stack, and separate data ports that convey data packets or frames. Typically, a controller may control a stack via the stacking ports. Some switches and routers include separate, fixed stacking ports and data ports. However, in these embodiments, the configuration of the switches and routers cannot be changed, so a stacking port cannot be used as a data port and vice versa. Consequently, these switches and routers are inflexible.

Alternatively, other switches and routers have ports that, in principle, can be configured as either stacking ports or data ports. While this approach is flexible, it can be difficult to appropriately configure the ports based on the needs of a particular implementation or deployment.

SUMMARY

In a first group of embodiments, an electronic device is described. The electronic device includes multiple networking devices arranged in a stack. The networking devices include data planes, control planes and configurable ports, where a given configurable port in the configurable ports may be configured as a data port or a stacking port. The data port may, via a data plane, direct packets or frames in a network based at least in part on destinations of the packets or frames, and the stacking port may, via a control plane, provide an internal switching fabric for the stack. During operation, a networking device in the networking devices may receive an instruction that designates the networking device as a master in the stack, where the networking device has at least a connection via a configurable port to one or more of remaining networking devices in the stack. In response to the instruction, the networking device may perform zero-touch provisioning of the stack. Notably, the networking device may provide one or more probe messages to determine a state of the networking devices, where the state includes one or more connections among the networking devices. Then, the networking device may verify that the one or more connections are correct. When the one or more connections are correct, the networking device may define a subset of the configurable ports in the networking devices as stacking ports.

Note the one or more connections may be correct when each of the networking devices has at least one connection, so that at least one configurable port on each of the networking devices is configured as a stacking port.

Moreover, when the one or more connections are correct, the networking device may define a remainder of the configurable ports in the networking devices as data ports.

Furthermore, when the one or more connections are incorrect, the networking device may provide or present a message. For example, the message may indicate that the one or more connections are incorrect.

Additionally, the networking device may determine a topology of the networking devices based at least in part on the one or more connections. For example, the topology may include a linear topology or a ring topology.

In some embodiments, the networking devices include a switch or a router.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

In a second group of embodiments, an electronic device is described. The electronic device includes a group of networking devices as a stack of networking devices, where at least some of the networking devices have configurable ports that are configurable as either a stacking port or a data port. During operation, a first of the networking device in the group of networking devices may receive an instruction designating the first of the networking devices as a master. Then, the first of the networking devices may automatically determine connections between the networking devices. Moreover, based at least in part on the determined connections, the first of the networking devices may configure a subset of the configurable ports as stacking ports.

Note that each networking device may include a data plane that directs packets or frames in a network.

Moreover, automatically determining connections between the networking devices may include sending one or more probe messages from the first of the networking devices to other of the networking devices, where the probe messages include an identifier of the first of the networking devices and an output port of the first of the networking devices from which the probe message was sent. Furthermore, the probe messages may each include a link data structure field. Note that, the link data field in the initial probe messages sent by the first of the networking devices may be empty. In some embodiments, the first of the networking devices may receive at the first of the networking devices message probes that include the link data structure field with link data information stored therein.

Additionally, the first of the networking devices may identify an invalid connection between two of the networking devices. Note that the invalid connection may include a connection to a non-configurable port on one of the networking devices that is not a stacking port.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
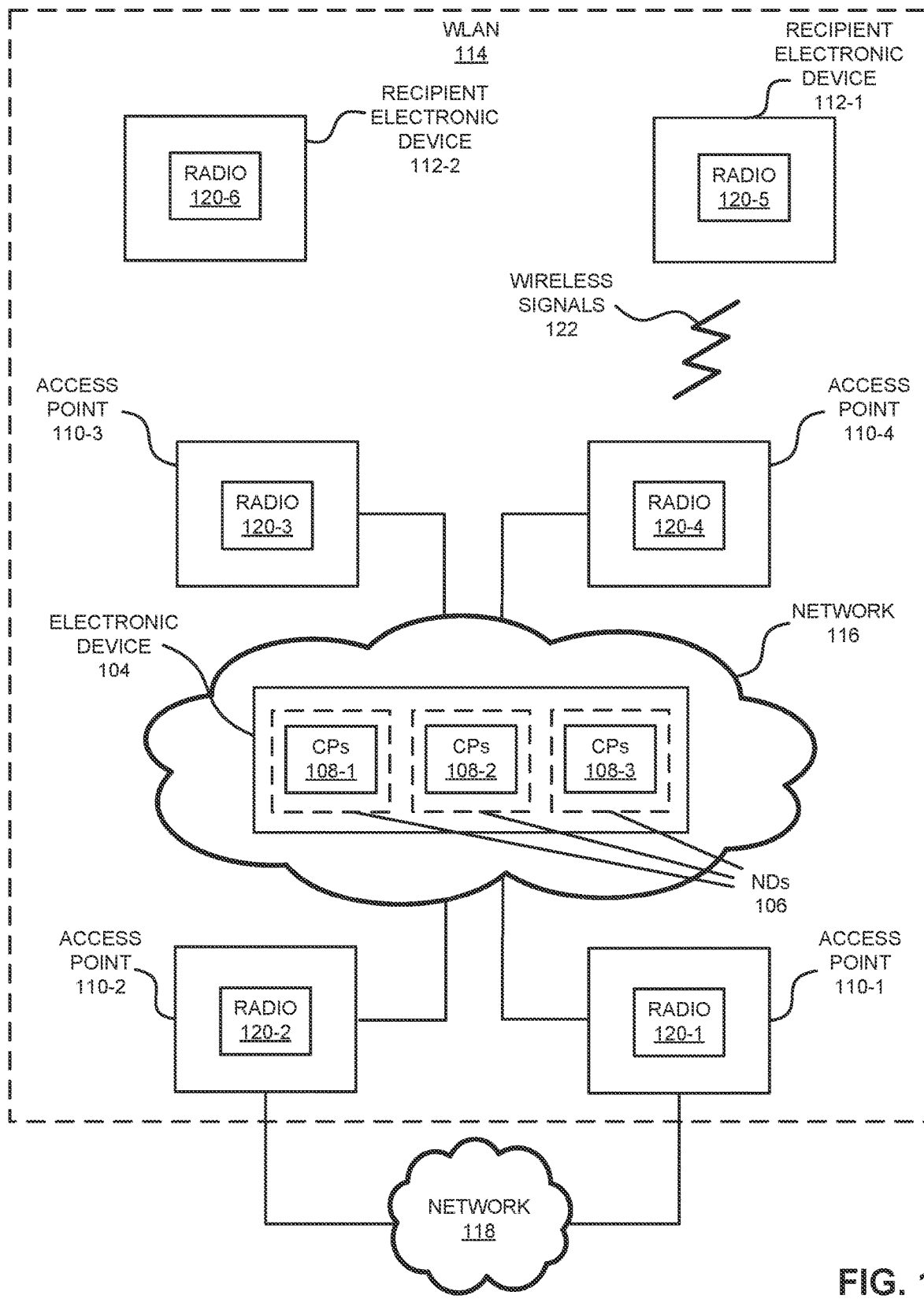
FIG. 1 is a block diagram illustrating an example of communication among access points and electronic devices in a wireless network in accordance with an embodiment of the present disclosure.

An electronic device is described. The electronic device includes multiple networking devices (such as switches or routers) arranged in a stack. The networking devices may include data planes, control planes and configurable ports, where a given configurable port in the configurable ports may be configured as a data port or a stacking port. The data port may, via a data plane, direct packets or frames in a network based at least in part on destinations of the packets or frames, and the stacking port may, via a control plane, provide an internal switching fabric for the stack. During operation, a networking device in the networking devices may receive an instruction that designates the networking device as a master in the stack, where the networking device has at least a connection via a configurable port to one or more of the remaining networking devices in the stack. In response to the instruction, the networking device may perform zero-touch provisioning of the stack. Notably, the networking device may provide one or more probe messages to determine a state of the networking devices, where the state includes one or more connections among the networking devices. Then, the networking device may verify that the one or more connections are correct. When the one or more connections among the networking devices are correct (such as when each of the networking devices has at least one connection), the networking device may define a subset of the configurable ports in the networking devices as stacking ports.

By performing the zero-touch provisioning, these configuration techniques (which are sometimes referred to as 'zero-touch provisioning') may simplify the installation and configuration of the electronic device. Notably, a user may manually connect at least the subset of the configurable ports in the networking devices, and may designate the master. Then, using the zero-touch provisioning, the electronic device may automatically determine the state and configuration of the configurable ports, even if the user connected the wrong configurable ports. Thus, the configuration techniques may allow the user to take advantage of the flexibility of the electronic device to correctly implement a configuration that is suitable for a particular deployment, with reduced effort, cost, time and complexity. Consequently, the configuration techniques may improve the user experience when using the electronic device.

In some embodiments, the electronic device may be used in conjunction with other electronic devices in a wireless network (such as an access point or recipient electronic devices, which are sometimes referred to as 'clients'), which may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Washington), and/or another type of wireless interface. In the discussion that follows, Wi-Fi is used as an illustrative example. However, a wide variety of communication protocols (such as Long Term Evolution or LTE, another cellular-telephone communication protocol, etc.) may be used. The wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.')

Moreover, the electronic device and/or the access point may communicate with one or more other access points and/or computers in the WLAN using a wireless or a wired communication protocol. Alternatively or additionally, the electronic device may communicate with other electronic devices (such as computers or servers) using the wired communication protocol. Note that the wired communication protocol may include an IEEE 802.3 standard (which is sometimes referred to as 'Ethernet') and/or another type of wired or wireless interface. In the discussion that follows, Ethernet is used as an illustrative example of the wired communication protocol.

FIG. 1 presents a block diagram illustrating an example of communication among one or more access points 110 and recipient electronic devices 112 (such as a cellular telephone, and which are sometimes referred to as 'clients') in a WLAN 114 in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4)

may communicate with recipient electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches. For example, WLAN 114 may include an electronic device 104 (which is sometimes referred to as a 'stacking system') with a stack of networking devices (NDs) 106, such as a stack of switches and/or routers.

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication within WLAN 114 (such as Ethernet) and wireless communication within WLAN 114 (such as Wi-Fi), and one or more of access points 110 may also support a wired communication protocol for communicating via network 118 with other electronic devices (such as a computer or a controller of WLAN 114, which may be remotely located from WLAN 114).

Figure 14:
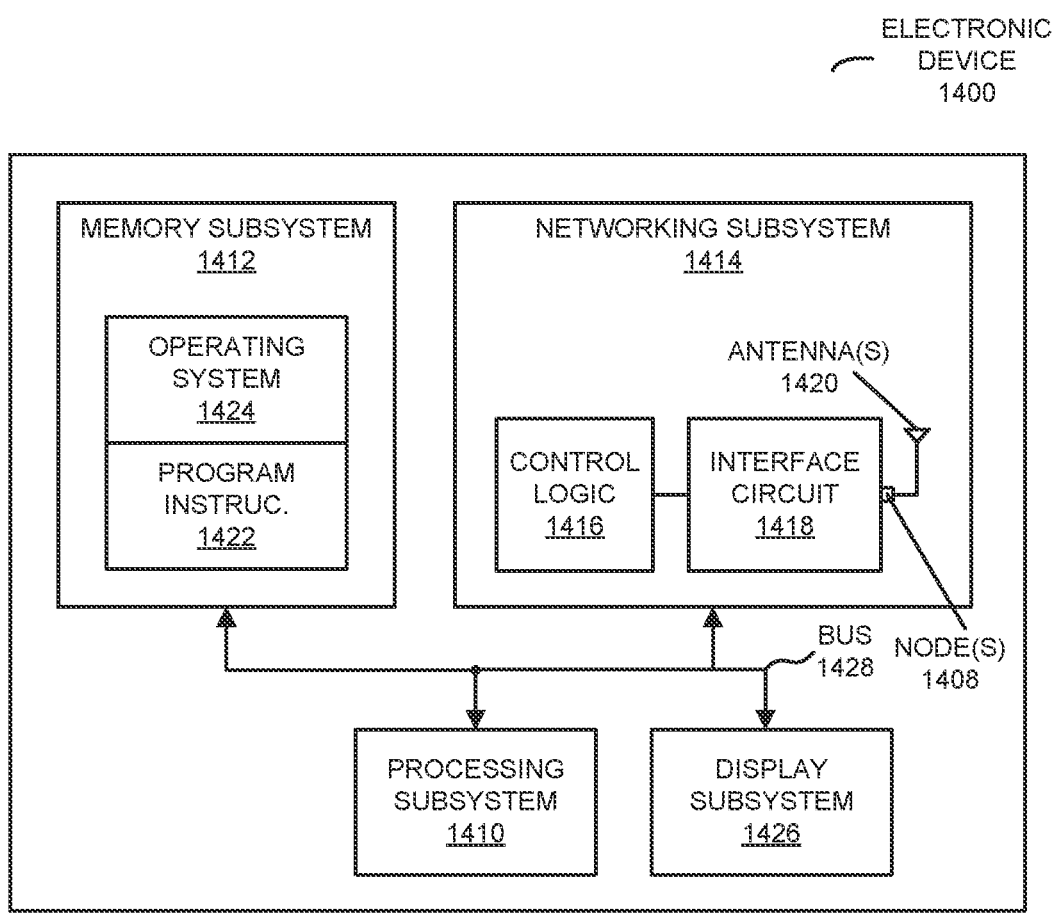
FIG. 14 is a block diagram illustrating an example of an electronic device in accordance with an embodiment of the present disclosure.

As described further below with reference to FIG. 14, electronic device 104, access points 110 and/or recipient electronic devices 112 may include subsystems, such as a networking subsystem, a memory subsystem and a processor subsystem. In addition, access points 110 and recipient electronic devices 112 may include radios 120 in the networking subsystems. More generally, access points 110 and recipient electronic devices 112 can include (or can be included within) any electronic devices with the networking subsystems that enable access points 110 and recipient electronic devices 112 to communicate with each other using wireless and/or wired communication. This wireless communication can comprise transmitting advertisements on wireless channels to enable access points 110 and/or recipient electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and recipient electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in recipient electronic device 112-1. Access point 110-4 may transmit packets or frames. In turn, these packets or frames may be received by recipient electronic device 112-1. Moreover, access point 110-4 may allow recipient electronic device 112-1 to communicate with other electronic devices, computers and/or servers via networks 116 and/or 118.

Note that the communication among access points 110 and/or with recipient electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and recipient electronic devices 112 includes: receiving signals (such as wireless signals 122) with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, configurable ports (CPs) 108 in the stack of networking devices 106 in electronic device 104 may be automatically configured using zero-touch provisioning. These configurable ports may be configured as data ports or stacking ports. A data port may, via a data plane, direct packets or frames in a network (such as network 116 or 118) based at least in part on destinations of the packets or frames, and a stacking port may, via a control plane, provide an internal switching fabric for the stack of networking devices 106.

Notably, as described further below with reference to FIGS. 2-13B, a user of electronic device 104 may designate one of networking devices 106 as a master in the stack networking devices 106. For example, the user may provide an instruction or a command (such as from a remotely located computer or electronic device that is not shown in FIG. 1) that specifies or designates the master. Note that the master may have at least a connection via configurable ports 108 to one or more of the remaining networking devices 106.

In response to the designation, the master may perform zero-touch provisioning of the stack of networking devices 106. Notably, the master may provide one or more probe messages to determine a state of the networking devices 106, where the state includes or specifies one or more connections among the networking devices 106. Then, the master may verify that the one or more connections are correct. Note the one or more connections may be correct when each of the networking devices 106 has at least one connection, so that at least one configurable port on each of the networking devices 106 can be configured as a stacking port.

When the one or more connections are correct, the master may define a subset of configurable ports 108 in the networking devices 106 as stacking ports. In some embodiments, when the one or more connections are correct, the master may define a remainder of configurable ports 108 in the networking devices 106 as data ports. Alternatively, in some embodiments, as a default, configurable ports 108 may be data ports, so that it is not necessary for the master to define the remainder of configurable ports 108 as data ports.

Furthermore, when the one or more connections are incorrect, the master may provide or present a message. For example, the message may indicate that the one or more connections are incorrect. Most incorrect connections come from invalid topologies. For example, if a networking device has direct connections to three devices, they are invalid connections (a networking device can have at most two neighbors in a linear or ring topology.) Another invalid connection example is when a candidate stacking port links to a data port.

Additionally, during the zero-touch provisioning, the master may determine a topology of the networking devices 106 based at least in part on the one or more connections. For example, the topology may include a linear topology or a ring topology.

In this way, electronic device 104 may be automatically configured. This may allow electronic device 104 to be flexibly and correctly used in a wide variety of deployments and environments. Consequently, the configuration techniques may increase customer satisfaction and retention.

Figure 2:
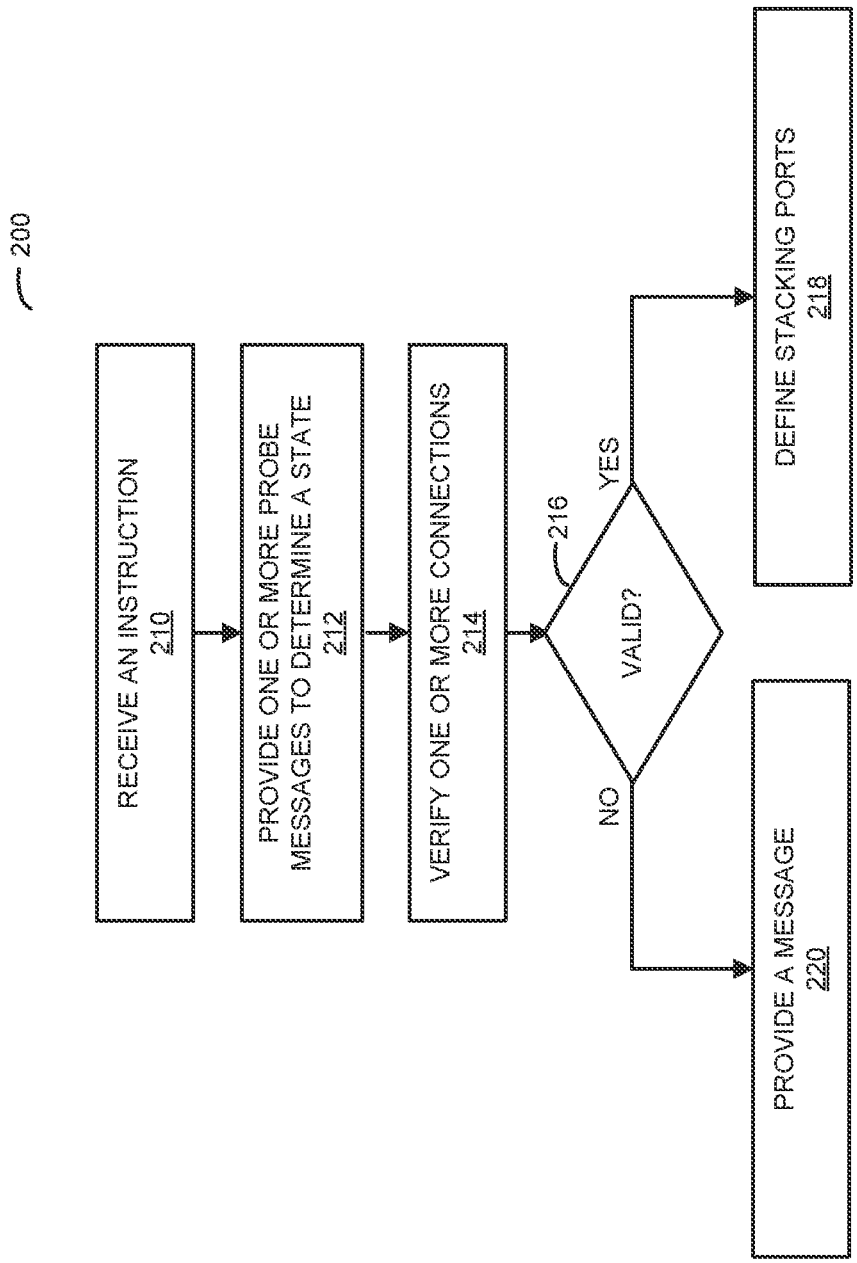
FIG. 2 is a flow diagram illustrating an example of a method for performing zero-touch provisioning using an electronic device in FIG. 1 in accordance with an embodiment of the present disclosure.

We now describe embodiments of a method. FIG. 2 presents a flow diagram illustrating an example of a method 200 for performing zero-touch provisioning using an electronic device that includes a stack of networking devices (such as switches and/or routers), such as electronic device 104 in FIG. 1. Moreover, the networking devices may include data planes, control planes and configurable ports, where a given configurable port in the configurable ports may be configured as a data port or a stacking port. The data port may, via a data plane, direct packets or frames in a network based at least in part on destinations of the packets or frames, and the stacking port may, via a control plane, provide an internal switching fabric for the stack.

During operation, a networking device in the networking devices may receive an instruction (operation 210) or a command that designates the networking device as a master in the stack, where the networking device has at least a connection via a configurable port to one or more of remaining networking devices in the stack. In response to the instruction, the networking device may perform zero-touch provisioning of the stack. Notably, the networking device may provide one or more probe messages to determine a state (operation 212) of the networking devices, where the state includes one or more connections among the networking devices. Then, the networking device may verify that the one or more connections (operation 214) are correct.

When the one or more connections are correct or 'valid' (operation 216), the networking device may define a subset of the configurable ports in the networking devices as stacking ports (operation 218). Note the one or more connections may be correct when each of the networking devices has at least one connection, so that at least one configurable port on each of the networking devices is configured as a stacking port.

In some embodiments, the networking device may optionally perform one or more additional operations. For example, when the one or more connections are incorrect (operation 216), the networking device may provide or present a message (operation 220). For example, the message may indicate that the one or more connections are incorrect.

Moreover, when the one or more connections are correct (operation 216), the networking device may define a remainder of the configurable ports in the networking devices as data ports. Furthermore, the networking device may determine a topology of the networking devices based at least in part on the one or more connections. For example, the topology may include a linear topology or a ring topology.

In some embodiments of method 200, there may be additional or fewer operations. Moreover, there may be different operations. Furthermore, the order of the operations may be changed, and/or two or more operations may be combined into a single operation.

Figure 3:
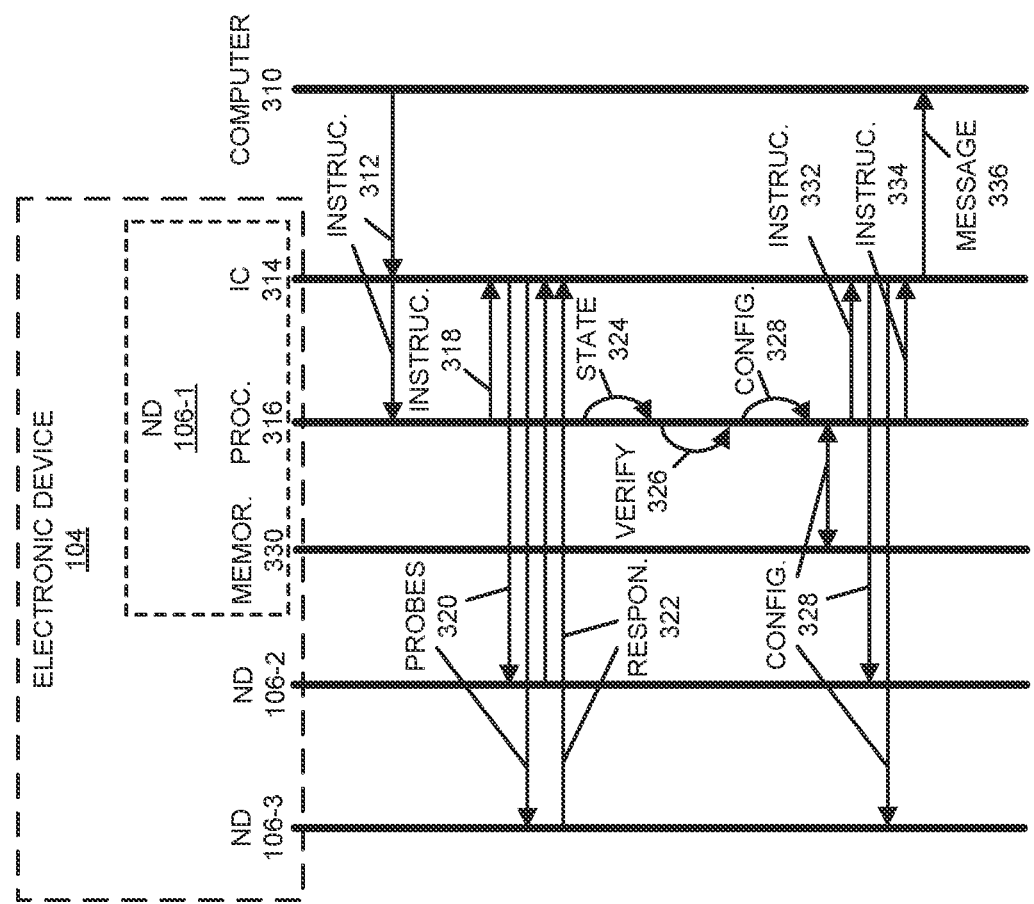
FIG. 3 is a drawing illustrating an example of communication among components in an electronic device in FIG. 1 in accordance with an embodiment of the present disclosure.

FIG. 3 presents a drawing illustrating an example of communication among components in electronic device 104 and computer 310. Notably, computer 310 may provide an instruction 312 to networking device 106-1 in electronic device 104 that designates networking device 106-1 as a master. After receiving instruction 312, an interface circuit 314 in networking device 106-1 may provide instruction 312 to processor 316 in networking device 106-1. Then, processor 316 may perform zero-touch provisioning of electronic device 104.

Notably, processor 316 may provide an instruction 318 to interface circuit 314 to provide one or more probes 320 to networking devices 106-2 and 106-3 in electronic device 104. Based at least in part on responses 322 to the one or more probes 320 from networking devices 106-2 and 106-3, which are received by interface circuit 314 and provided to processor 316, processor 316 may determine a state 324 of networking devices 106, including one or more connections among networking device 106-1, 106-2 and 106-3. Then, processor 316 may verify 326 that the one or more connections are correct.

When the one or more connections are correct, processor 316 may define a configuration 328 for at least a subset of the configurable ports in networking devices 106. Then, processor 316 may store configuration 328 in memory 330 in networking device 106-1, and may instruct 332 interface circuit 314 to provide configuration 328 to networking devices 106-2 and 106-3. Alternatively, when the one or more connections are incorrect, processor 316 may instruct 334 interface circuit 314 to provide an error message 336 to computer 310, which may provide or present error message 334 to the user.

While FIG. 3 illustrates communication between components using unidirectional or bidirectional communication with lines having single arrows or double arrows, in general the communication in a given operation in these figures may involve unidirectional or bidirectional communication.

In some embodiments, there may be two types of networking devices. Notably, a first type of networking device is a chassis system with separate modules (such as a line card, a management module, one or more backup management modules, a port module, etc.) and a backplane with a switching fabric. In general, a chassis system is expensive, but may have a reduced management cost. Moreover, a chassis system typically has one configuration and one Internet Protocol (IP) address.

A second type of networking device is a standalone system (or box or device). Typically, a standalone system may have a fixed configuration. A standalone system may have a high management cost, and may include a few modules (such as 10 Gbps or 100 Gbps uplink ports that are used by an edge of a network).

A stacking system or stacking product may include two or more networking devices (which may have fixed configurations). In existing stacking systems, the networking devices may have unique stacking ports (which provide a switching fabric similar to a backplane via an external cable or connection). Typically, a stacking system is treated as a single logical unit for management. For example, a stacking system may include three physical networking devices, which act as one logical unit, with one configuration and one IP address. Thus, a stacking system may provide the advantages of a chassis system. In general, stacking systems are cheaper, scalable and easier to manage than other networking devices. Note that a stacking port (which is sometimes referred to as a 'HiGi' port') is different from a data port (which is sometimes referred to as an 'IEEE port'), and a stacking port usually has high speed and is expensive.

When stacking ports are fixed, the stacking system may be simpler. However, it is also inflexible. In order to address this challenge, in the present disclosure a stacking system may include configurable ports, which can be configured as stacking ports or data ports. One challenge with this approach, is how to correctly configure the configurable ports based at least in part on the connections and needs of a particular network or deployment.

In order to address this problem, in the disclosed configuration techniques, one of the networking devices in a stacking system may be used to perform zero-touch provisioning. Notably, after a user specifies or indicates which one of the networking devices is a master (e.g., by providing a zero-touch-provisioning command to the networking device), the remainder of the configuration techniques may be performed automatically (and, thus, without further user or operator action). This approach may allow the networking device to determine the state of the networking devices (and their physical connections) in a stacking system, to verify that the connections are correct, and then to define a subset of the configurable ports as stacking ports. Thus, by specifying the networking device as the master, this networking device may then bootstrap the configuration of the stacking system.

Alternatively or additionally, in some embodiments, a user may manually connect the networking devices in a stacking system. Then, the zero-touch provisioning may be used to detect and automatically configure the stacking ports in the networking devices.

For example, a stacking device may include three modules. A first module may include 24 or 48 data ports. A second module and a third module may each include six configurable ports, at least some of which may be defined as stacking ports.

Figure 4:
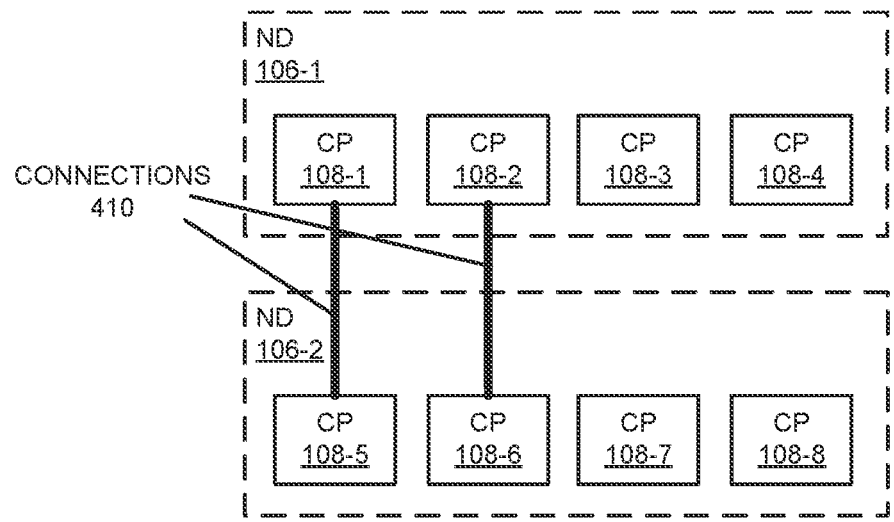
FIGS. 4-13B are drawings illustrating examples of networking devices in accordance with an embodiment of the present disclosure.

FIG. 4 presents a drawing illustrating an example of networking devices 106. Notably, networking devices 106 may have connections 410 among at least some of configurable ports 108. Moreover, as shown in FIG. 5, which presents a drawing illustrating an example of networking devices 106, after networking device 106-1 has been defined as a master, the state may be determined, connections 410 may be verified, and at least some of the configurable ports 108 may be defined a stacking ports (SPs) 510, and the remainder of the configurable ports 108 may be data ports (DPs) 512.

Figure 5:
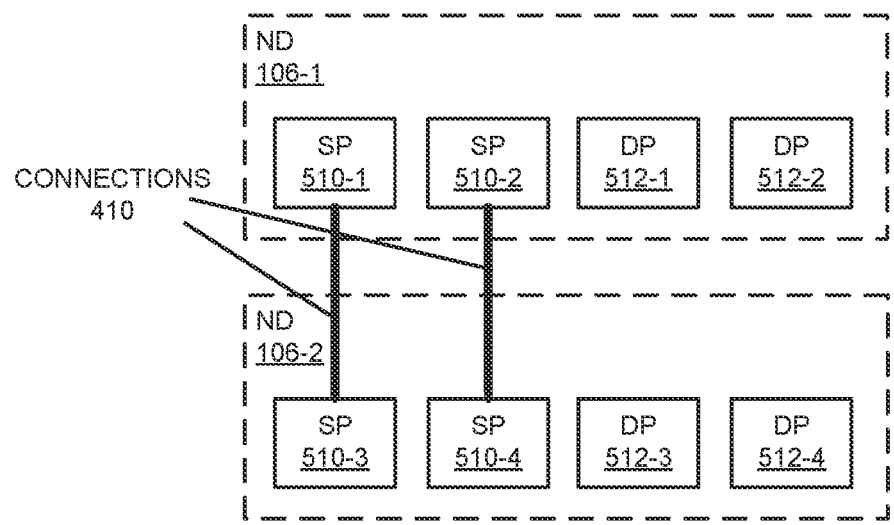

While FIGS. 4 and 5, and the subsequent embodiments in FIGS. 6A-13B include particular numbers of networking devices 106 and configurable ports 108, these embodiments are intended as illustrations. In other embodiments, there may be more components, fewer components, different components, two or more components may be combined and/or positions of the components may be changed.

In some embodiments, the configuration techniques may simplify the stack construction. Notably, after a user cables or connects the networking devices together, the configuration technique may be used to perform the remaining configuration operations. This capability may be useful for cloud-based management, where a user does not need to perform any of the configuration. Moreover, the configuration techniques may detect new links or connections among members of a stack, and may automatically enlarge the stacking port configuration. Furthermore, the configuration techniques may detect a wrong or incorrect configuration, in which a stacking port links or connects to a configurable port that is currently data port, and may correct the configuration. Additionally, the configuration techniques may support a linear-stacking-port set for two networking devices that puts the stacking ports into a link aggregation group (LAG or trunk) in a stack with two networking devices. This approach may double the stacking ports bandwidth compared to a stack with a ring topology and two networking devices. It may also allow a user to qualify a stringent throughput test.

In general, networking devices are generally classified in two groups: chassis systems, and standalones. A chassis system may include a box with power supplies and switching fabrics. It may provide slots for users to insert modules (or blades). It usually needs one or two (for redundancy) management modules and multiple modules that have data ports. Typically, the ports are in the front panel of a module, because the back of a module is inserted into a slot that provides power and the switching fabric.

A chassis system may offer ease of management (because there is usually a single point of management). Notably, the entire chassis system may be managed as one logical device. For examples, a chassis system may be managed by one configuration. Then, when a customer copies new software to the chassis system, it may be distributed to the modules. Moreover, a chassis system may have a high port density, short switching latency and redundancy (such as multi-module link aggregation (e.g., LAG or trunk), and a backup management module).

Alternatively, a standalone device may include contain one or two power supplies and data ports. It may contain a few small pluggable modules at the front or back panels. Standalone devices may have a low cost, and may be flexible (e.g., additional instances can be installed when needed).

For example, the front panel of a standalone device may include a left part that has a console port and an Ethernet management port. It may contain 48 Gbps copper ports, and six 40-Gbps optical ports. Another six 40-Gbps ports may be at the back panel. Some high-end standalone devices may contain high-speed optical ports, such as 32 40 Gbps optical ports. Note that the console port may provide serial communication to the standalone device to enter commands, to perform configuration or to show the status. Moreover, the Ethernet management port may be usable after an IP address is obtained. The IP address may be configured through the console port, or may be assigned by a DHCP server linked to any port in the standalone device.

In some embodiments, the Ethernet ports may be divided into multiple modules based at least in part on different speeds or types. For example, the Ethernet ports may be divided into two modules. The 48 copper ports on the left-hand side may be in module one, and six optical ports on the right-hand side may be in module two. In addition, there may be another six optical ports in module 3 at the back panel. In general, copper ports may be used to link to end electronic devices, such as a computer. These copper ports may be power over Ethernet (PoE) capable and may deliver power to end electronic devices (such as an IP or Internet telephone or an access point). The optical ports, which have higher speed, are usually used for linking to other switches/routers.

Note that in a ring topology, port three in a first networking device may be connected to port two in a second networking device, port three in the second networking device may be connected to port two in a third networking device, and port three in the third networking device may be connected to port two in the first networking device. Alternatively, in a linear topology with a single port between networking devices, port three in a first networking device may be connected to port three in a second networking device, and port three in the second networking device may be connected to port three in a third networking device. Similarly, in a linear topology with two ports between networking devices, ports two and three in a first networking device may be respectively connected to ports two and three in a second networking device, and ports four and five in the second networking device may be respectively connected to ports two and three in a third networking device.

A stacking system (which is sometimes referred to as a 'stack') may take advantage of the low cost and flexibility of standalone devices, and may manage them as a single logical device, just like a chassis system. In a stacking system, multiple standalone devices may be linked or connected by stacking ports that behave analogously to a chassis-switching fabric.

A stacking system may have a master networking device (which is sometimes referred to as a 'master') that manages other networking devices. It may have a similar function to the management module in a chassis system. The difference is that a master in a stacking system is no different from the other networking devices in a stacking system. Moreover, a management module in a chassis system may not have data ports, and is usually different from the data modules. In some embodiments, another of the networking devices in the stacking system may operate or function as a standby. If the master fails, this standby networking device may take over the management responsibilities. Therefore, when there is such a failure, a stacking system may still function (except the ports in the master) if it has a ring topology.

Note that each networking device in a stacking system may have an identifier. For example, the identifier typically varies from 0 or 1 to the maximum stack identifier. In contrast, a chassis module identifier is usually based on the slot position. The identifier of a networking device in a stacking system often has no relationship to the topology connection order. Thus, the positions of two networking devices in a stacking system may be swapped, and they may still keep their original identifiers.

A stacking system is usually treated as a logical unit from the perspective of a user. However, a stacking system may be as complicated as a chassis system. For example, there may be a variety of hardware functions to support stacking systems, including hardware support for a special tag containing information for packets that travel through different networking devices and ports in the stack. The tag may be 8 bytes or 16 bytes, and may be added to a packet by hardware when it arrives at any data port in the stack. The tag may be stripped off or replaced by a standard tag when it leaves a data port of the stack. Moreover, a processor in a master may send packets the processor in other networking devices (and vice versa) using inter-process communication (IPC). Furthermore, a processor in the master may send a packet directly out of any port in the stack. In order to do so, the processor may construct a proper tag, so the packet can travel to the correct destination port without processing by a processor in another networking device.

In some embodiments, when a packet reaches a port of a member networking device in the stack, there may be multiple actions depending on the packet type. Moreover, a packet may be switched/routed in hardware to any port in the stacking system without any processor processing. For example, a packet may be Layer-2 (L2) switched or Layer-3 (L3) routed in hardware. Furthermore, a packet may be trapped to a local processor of the incoming networking device for software processing. Additionally, a packet may be forwarded in hardware to the processor in the master for processing. In general, complicated L2 and L3 protocol packets may be handled by the processor in the master.

Once a stack is formed, packets may be switched/routed in hardware from one port to another port in the stack without going to a processor in a given networking device. The hardware behavior may be similar to that of a chassis system except that a chassis system may have shorter latency. Moreover, the software behavior of a stacking system may be similar to that of a chassis system. For example, a stacking system may allow ports of a link aggregation group (LAG or trunk) to spread onto multiple networking devices, just like multiple modules in a chassis system. Furthermore, both a stacking system and a chassis system may have a single point of contact, and may manage the entire system with one set of configurations. When a user copies new software, a stacking system and a chassis system may copy the software to the modules or networking devices. Furthermore, when a packet destined for a stacking system or a chassis system arrives at any port, it may be forwarded in hardware to the master in a stacking system or the management module of a chassis system for software processing.

In general, a stacking system may have the advantages of both a standalone device and a chassis system (except the shorter switching latency of a chassis system). Notably, a stacking system may offer or provide: low cost, flexibility (additional instances can be installed as needed), a high port density, ease of management (e.g., a single point of contact), and redundancy.

The stacking ports used to connect networking devices in a stacking system may be considered to be internal ports. They may act like the switching fabric in a chassis system backplane. However, there are usually some differences. Notably, a switching fabric in a chassis system may be connected in a mesh and may provide very low latency when switching packets between modules. The latency in a stacking system is typically longer because packet switching may go through a few hubs. In addition, a failed networking device may affect other networking devices because of a non-mesh topology. For example, if a middle networking device in a linear topology fails, the stacking system may break, because the master cannot communicate to the networking devices behind the failed networking device. A ring topology provides better resilience, because, when a networking device in the ring fails, the topology becomes linear and the remaining networking device reroute traffic.

In a stacking system, the networking devices may be classified as: a master, standby and members. Typically, there is one master in a stack, which is the point of contact of the entire stack and may manage the entire stack. Most packets destined to the IP address of the stack may be forwarded to the master for processing regardless of which networking device at which it arrived. For example, a master may handle most routing protocols for the protocol packets coming to the stack. However, in some embodiments, some simple protocol packets may be handled by the local receiving networking device.

Moreover, a member may behave like a dummy networking device, or a line card in a chassis system. Notably, a member may program its hardware based at least in part on instructions from the master. Therefore, a packet may be switched or routed in hardware to the correct destination without going to the processor of each networking device.

Furthermore, a member may handle certain types of packet in its processor without forwarding them to the processor of the master for processing. These packets usually have local scope, such as link negotiation, sample flow (s-flow) or unidirectional link detection (UDLD) protocols. However, a member may forward complicated routing protocols (such as open shortest path first or OSPF) to the master for processing. The forwarding may be performed in hardware and/or in software depending on the hardware chip capabilities. Note that there may be multiple members in a stack.

In general, standby is an optional role. This may be a member, but with additional responsibility to take over the role of the master if the master fails. If a standby networking device wants to take over quickly (within a few seconds) with little traffic interruption, it may be constantly synchronized with the running states of the entire stack from the master.

Most commercial stacking systems support linear and ring topologies. In embodiments with multiple ports between networking devices, the ports may be programmed in a link aggregation group (LAG or trunk), so traffic is distributed to each port to balance load.

In general, a ring topology may provide better resilience than a linear topology when there are more than two networking devices. However, when a stack only includes two networking devices, a ring topology is not better than a linear topology, because, if one of the networking devices fails, there is only one networking device left regardless of the topology.

While a port is a single port, a trunk or link aggregation group may contain multiple ports that function like a logical port. In these embodiments, traffic may be distributed to ports in a link aggregation group. The distribution may be based at least in part on hashing packets to a specific port in a link aggregation group. Moreover, the hashing may be based at least in part on packet headers, such as destination media access control (MAC) address, a source MAC address, a destination IP address, a source IP address, or UDP/TCP source/destination port numbers. In general, packets of a same session may be hashed to the same port in order to avoid out of order delivery. Furthermore, traffic may be distributed to the ports that are up or available in a link aggregation group. Whenever a port of a link aggregation group goes up or down, the traffic may be redistributed to up ports in the link aggregation group. Note that a link aggregation group may provide advantages over a single port, including increased bandwidth, and resilience. As long as one port is up in a link aggregation group, the link aggregation group may be functional.

In a stacking system, stacking ports may be used to connect networking devices. They may be considered to be internal ports similar to the switching fabric of a chassis system. A stacking port may be an Ethernet ports just like a data port. However, a stacking port may be programmed differently, so that ingress and egress packets may need to carry a tag. This tag may include information about how the packet should be switched. For example, a packet may be received on a data port x in a first networking device. The hardware may decide that the packet should be forwarded out of port y in a fourth networking device. Therefore, the first networking device may add a tag to the packet. Then, every networking device may forward this packet based at least in part on the information in the tag until it reaches the fourth networking device. When the packet egresses to port y, the tag may be stripped off.

A stacking port and a data port may not be able to communicate because of different hardware settings. In some embodiments, both types of ports cannot come up if one end of a link is a stacking port and the other end is a data port. Consequently, in the configuration techniques, a stacking port may be defined or programmed if the other end of a connection or a link is also a stacking port.

Note that stacking systems typically support linear and ring topologies. In these topologies, each networking device may have up to two directions, and each direction may contain one or multiple ports. Many commercial stacking systems have dedicated stacking ports for both directions. These are typically marked or grouped differently from data ports. Therefore, users are less likely to make mistakes in connecting stacking ports. However, even if a user connects stacking ports to stacking ports, there may still be some mistakes. For example, two ports of one direction may be linked to different networking devices, or to different directions of other networking devices.

A dedicated stacking port design is not flexible. Even if a stacking port is not used, it cannot be used as data port. Therefore, a dedicated-port approach usually wastes resources. Moreover, some users may have different requirements. For example, a large stack, or very high throughput may need more stacking ports per networking device. Consequently, a fixed number of stacking ports may not meet the very stringent throughput requirements.

In embodiments with flexible or configurable ports, the maximum number of stacking ports may vary. For example, a stacking system may support up to 12 40-Gbps stacking ports per networking device. Therefore, users may choose to have between one and 12 stacking ports. Those configurable ports that are not configured as stacking ports can be used as data ports. Alternatively, some less-expensive stacking systems may support up to 4 10-Gbps stacking ports. Each networking device may have up to two directions. If a direction has multiple stacking ports, they may be in a link aggregation group (LAG or trunk), so the traffic can be distributed to every port in the link aggregation group in order to balance loads.

Flexible or configurable ports may present more challenges than dedicated or fixed stacking ports. Notably, with configurable ports, it is difficult to ensure correct connections and configurations. For example, users often make cabling or connection errors in stacking systems (in general) and, in particular, in stacking systems with configurable ports. This is because stacking ports and data ports look the same, the number of potential stacking ports is, in general, larger than the number of dedicated stacking ports, and users may attempt to set up a complicated arrangement because of the flexibility.

There are a wide variety of stacking port connection errors. For example, a networking device may be linked to more than two networking devices, and a stack may support ring or linear topologies. Therefore, a networking device may have up to two neighbors. When wiring the connections correctly, a user may link a port for one direction to a port having the same or a different direction in another networking device. Alternatively, a stacking port may loop back onto itself. Moreover, a stacking port may link to a non-stacking port. This is less likely to happen in a dedicated stacking system because the stacking ports are marked or grouped differently. This type of error may have functional impact if both ends are up (depending on the platforms). Notably, some of the traffic could be hashed to the mismatched stacking port, and may be dropped because both ends cannot communicate. Furthermore, the total number of networking devices in a stack may exceed an upper limit (such as a maximum of 8, 10 or 12 networking devices in a stack). Additionally, the ports of one direction may link to another networking device in an incorrect order. While this type of error may not have a functional impact, users may not want this type of error because it makes it difficult to track connections.

Figure 6A:
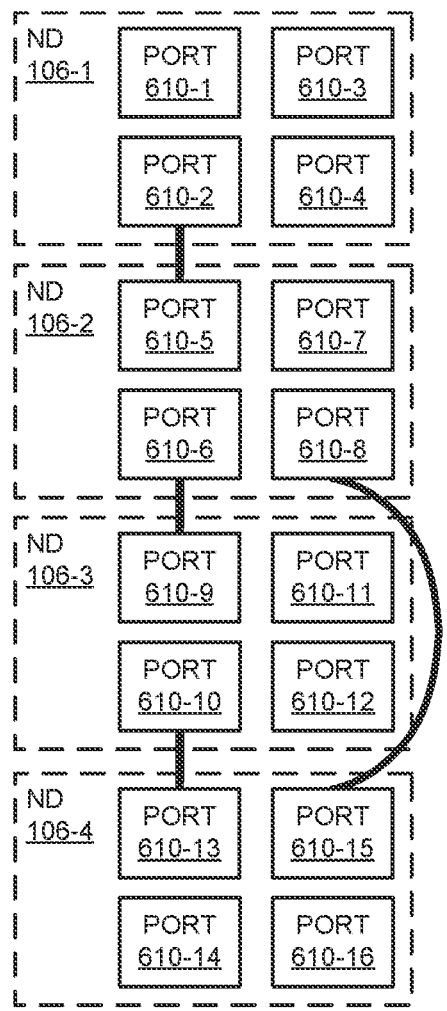
Figure 6B:
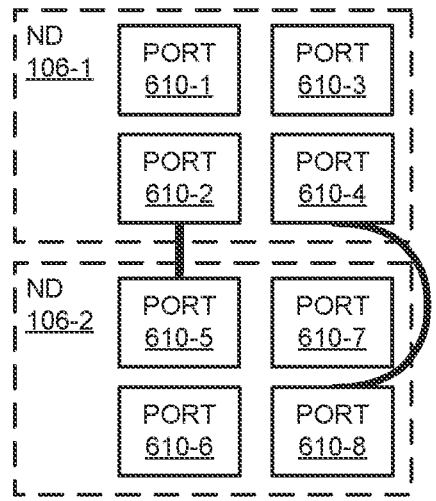
Figure 6C:
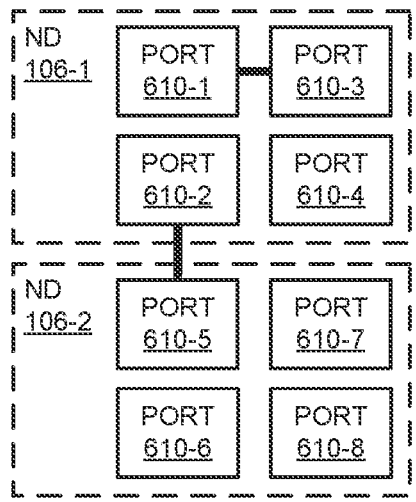
Figure 6D:
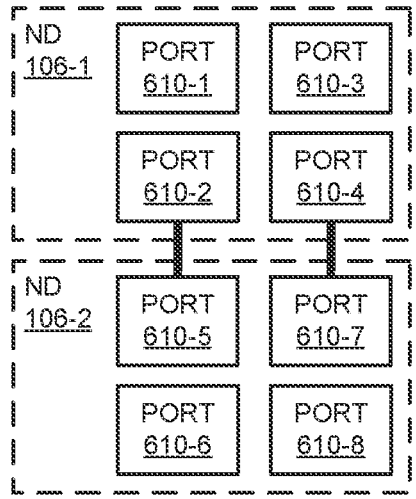
Figure 6E:
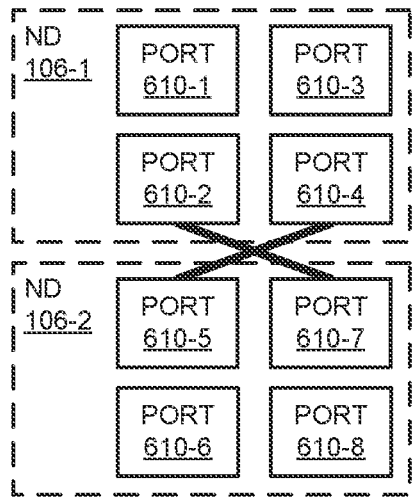

FIGS. 6A-6E present drawings illustrating examples of networking devices 106. Notably, in FIG. 6A, networking device 106-2 may, via ports 610, link to more than two networking devices, such as networking devices 106-1, 106-3 and 106-4. Moreover, in FIG. 6B, ports 610 in a direction of networking device 106-1 links to two directions of networking device 106-2. Furthermore, in FIG. 6C, port 610-1 of networking device 106-1 links back to port 610-3 of networking device 106-1. Additionally, in FIG. 6D, a stacking port 610-4 of networking device 106-1 is connected or linked to a non-stacking data port 610-7 of networking device 106-2. As shown in FIG. 6E, in some embodiments there may be an out-of-order connection among ports 610 of networking devices 106-1 and 106-2.

Obviously, a stacking system with dedicated stacking ports does not need to configure the stacking ports, because the dedicated stacking ports are always stacking ports. Alternatively, users typically configure every stacking port in a stacking system with configurable ports. Moreover, a networking device has up to two directions. Therefore, users may configure stacking ports of each direction. In some embodiments of the configuration techniques, a stacking system may define a default stacking-port configuration for a new networking device. For example, the configurable ports may initially function as data ports.

Furthermore, there may be restrictions on the configurations of configurable ports, including: ports of different speeds may not be in the same direction; ports in the same direction may use the same optics; stacking systems may have different restrictions in pairing stacking directions (e.g., both directions may be in the front panel or the back panel; stacking ports in a direction may need to be contiguous; only some ports may be the first port in a direction; and/or the maximum number of ports in a direction may not exceed a number (which may depend on other factors).

Even with restrictions, the configurable stacking ports may still allow many combinations. For example, a stacking system may have two ports in each direction. Thus, a first direction may have ports one and two, and a second direction may have ports three and four. Even a stacking system that require that the starting port of a direction must be either port one or three, may still have eight combinations of stacking ports: one; three; one and two; three and four; one and three; one, two and three; one, three and four; and one, two, three, and four. In some embodiments, a stacking system may have 100 combinations.

The manual procedures to form a stack may include a user configuring the correct stacking ports on each networking device in a stack. However, this is a tedious procedure, and users are not allowed to make any mistakes because the configurations are often subject to restrictions. Thus, the user may need to physically link stacking ports correctly, so that the stacking ports can communicate and form a stack. Then, the user may enable the stacking feature. Note that stacking systems from different vendors or manufacturers typically use proprietary techniques. Consequently, in existing stacking systems, the use of networking devices from different vendors is often impossible.

In the disclosed configuration techniques, zero-touch provisioning is used to address these problems. Notably, a user may not need to configure stacking ports. Instead, a user may simply connect stacking ports and then may provide a zero-touch-provisioning command to designate a master. Then, the master may probe the topology and may appropriately configure the stacking ports of the networking devices so a stack can be formed. If there are any physical connection errors, the master may provide an error message with a reason to a console of the user, so the user can correct the error. Note that a master may be a standalone device in a stack, or may be included in a stacking system with zero or more standalone devices.

Zero-touch provisioning may be performed before or after linking new networking devices. Once enabled, zero-touch provisioning may periodically send probes to detect new networking devices and may configure the new networking devices so they can join the stack. In this way, networking devices may be added to a stack in installments.

In order to prevent a standalone device being annexed during zero-touch provisioning to become a networking device in a stack, zero-touch provisioning may discover networking devices with a default setting (i.e., that have not already been configured, such as new networking devices). In general, a working networking device typically requires a minimum configuration or setting, such as IP address or current date and time. Vendors usually provide ways to set a networking device to default setting. In some embodiments of the configuration techniques, a default setting of a networking device may not enable stacking. For example, default stacking ports may behave like data ports.

Zero-touch provisioning may pose several challenges. Notably, zero-touch provisioning may work on a master that is a standalone device, or a stack that includes several networking devices. Moreover, a new networking device may link to the master or to one or more members. Furthermore, a new networking device may link to a stacking port or regular data port of a stack. Additionally, a connection between a stacking port and data port may not be allowed. In some embodiments, link negotiation may be used to solve this issue.

Note that a connection may cause L2 loops in which packets circulate forever, and may be broadcast to other ports and networking devices. The looped traffic may saturate a link and thus may severely impact the normal traffic and zero-touch-provisioning packets. In contrast, approaches with dedicated stacking ports may not have this problem, because links are always programmed as a stacking link aggregation group and behave like a logical link.

Moreover, as noted previously, physical connections may be implemented incorrectly (such as incorrect wiring). During the configuration techniques, the master may need to detect errors and provide a reason for an error, so a user can correct it. Furthermore, there may be multiple configurations that satisfy a stacking port restriction and the physical connections. The master may need to select one configuration. For example, suppose five links are detected between two networking devices. Zero-touch provisioning may put the five links into a link aggregation group and may form a linear topology, or it may divide the five links into two directions to form a ring topology.

Figure 7A:
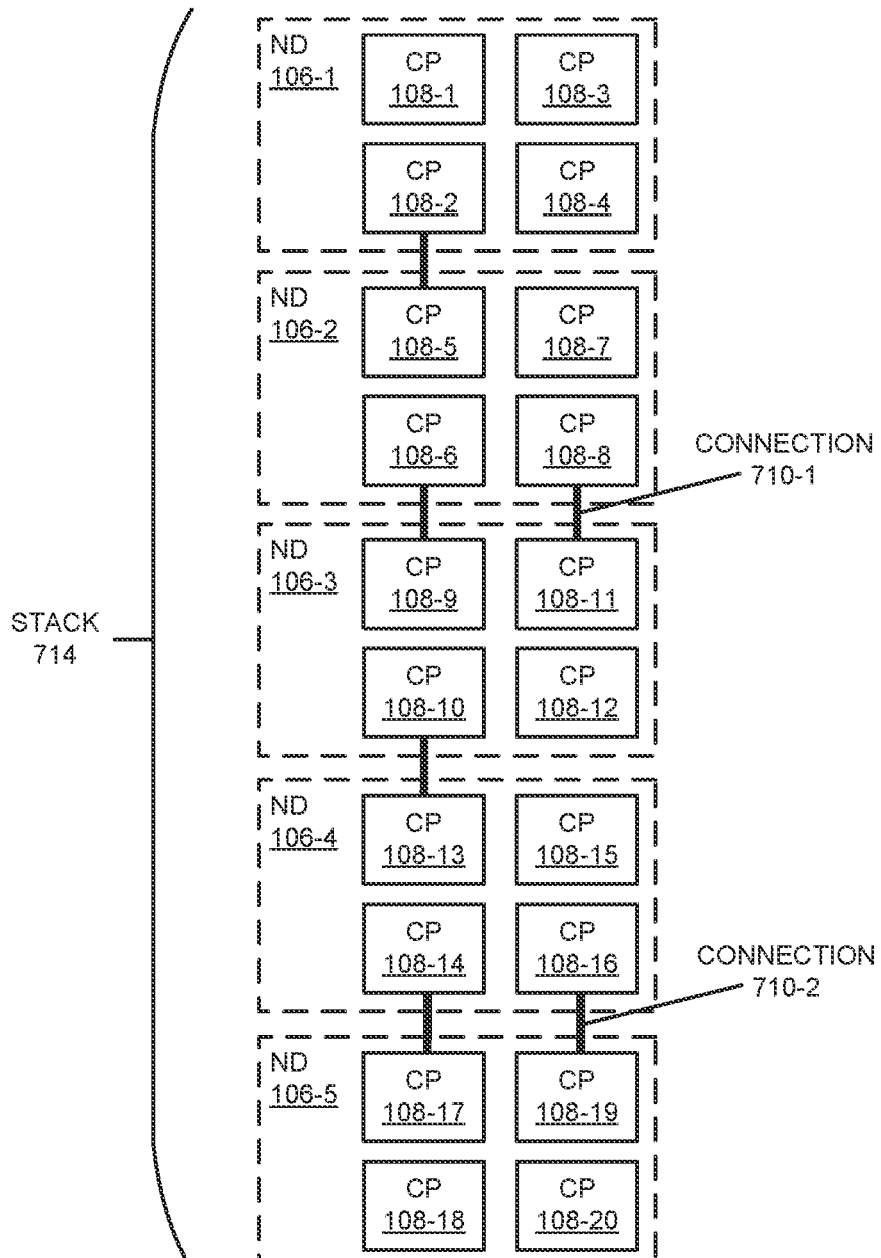
Figure 7B:
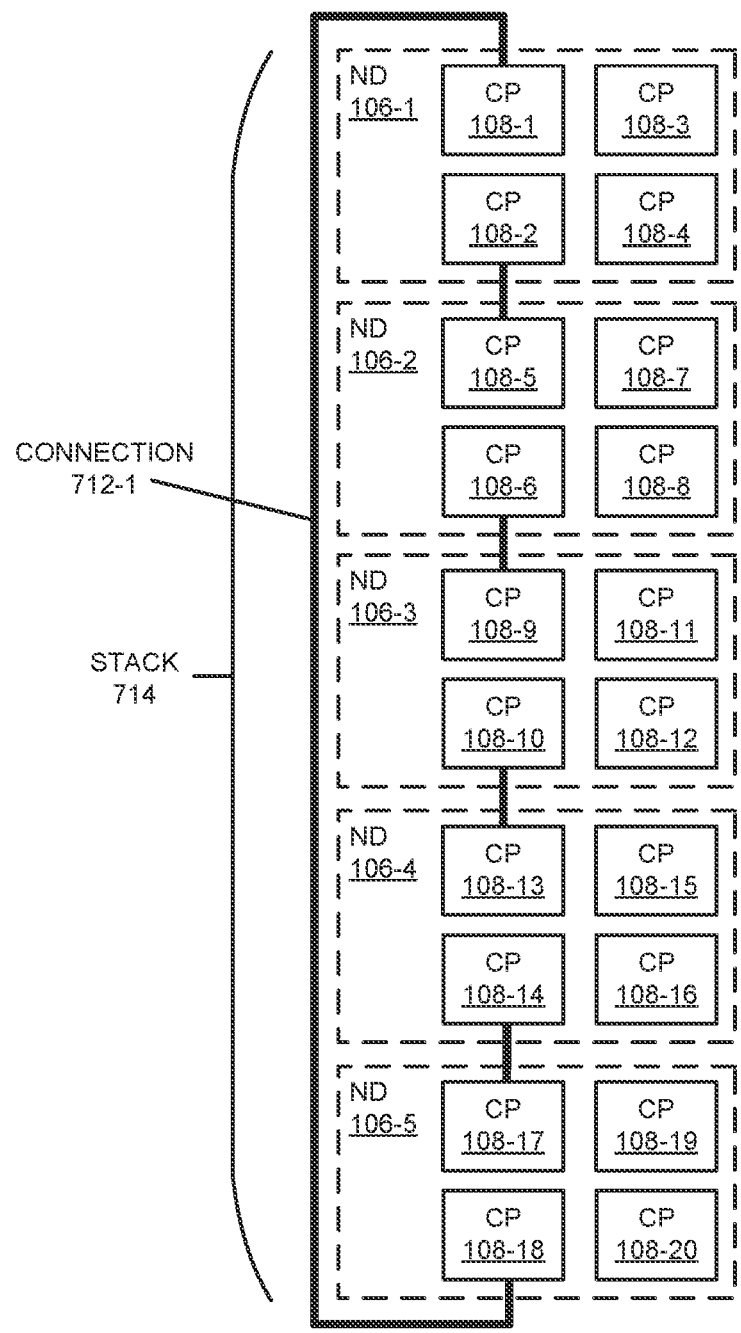

Zero-touch provisioning may detect new links between existing networking devices. FIGS. 7A and 7B present drawings illustrating examples of networking devices 106. Notably, FIG. 7A shows new stacking links or connections 710 for networking devices 106 in stack 714. Using zero-touch provisioning, the master (networking device 106-4) may detect connections 710 and may change instances of a single stacking port into a two-port stacking link aggregation group (such as configurable ports 108-6 and 108-8). FIG. 7B shows new links 712 or connections to two end networking devices 106-1 and 106-5 of a stack 714. In this embodiment, the master (networking device 106-4) may use zero-touch provisioning to configure stacking link aggregation groups of networking devices 106-1 and 106-5 and may convert the stack from a linear topology to a ring topology.

In some embodiments, the configuration techniques involve link negotiation. This may address the problem that a stacking port cannot communicate with a data port. A stacking system and new networking devices may already have configured stacking ports. It is also possible that a stacking port links to a data port in a stacking system with configurable ports. The goal is to make them communicate regardless of the connections. A link negotiation technique may be performed after zero-touch provisioning is used to configure the networking devices. Notably, during link negotiation, a down port may programed to an IEEE mode (i.e., as a data port).

From a hardware perspective, there may be two types of port programing: a port that is programmed as a HiGi port may need a special tag in packets coming or leaving the port; and an IEEE port (which is a data port) that is used to link to other switches/routers or peripheral components, such as computers. Moreover, there may be three types of connections for port programming. A HiGi port-to-HiGi port connection, a HiGi port-to-IEEE port connection (which cannot communicate, and thus either or both ports in a link may be up or down depending on the type of platform), and an IEEE port-to-IEEE port connection.

In terms of communication, the configuration techniques may want each of the types of connections to be able to communicate. When both ports in a connection are stacking ports, both of the ports may be in HiGi modes to perform stacking functions. Moreover, when one port is a stacking port and the other is a data port, both ports may be placed in IEEE modes, so that they can communicate for purposes of zero-touch provisioning. Furthermore, when both ports are data ports, both ports may be in IEEE mode.

In order to ensure communication with different types of connections, when a port is a data port, it may always be in IEEE mode. Moreover, a networking device may program any port with a down state to an IEEE mode. For example, when a HiGi stacking port goes down, it may be hardware programmed to an IEEE mode. (Note that it may still have a software stacking port configuration.) Therefore, when a stacking port comes up, it may always be in IEEE mode. It may enter a HiGi mode after going through link negotiation, if the other end of a link is also a stacking port. However, if the other end of the link is a data port, this stacking port may remain in an IEEE mode.

As noted previously, link negotiation may optionally be used to form a stack after zero-touch provisioning each of the networking devices. The purpose of link negotiation may be to achieve desired hardware modes, so they can communicate regardless of the mismatched configuration of either or both end ports.

The zero-touch provisioning may need to be able to handle dynamic configuration changes. For example, the link negotiation may be between linked stacking ports of two networking devices that enable the stacking feature. Each of the networking devices may know their stacking-port configuration.

Note that a negotiation packet may have a specific destination MAC address. The hardware of the networking devices may be programmed to trap packets with this MAC address to the local processor. These packets may not be forwarded or switched to any other networking device.

The following operations may be applied to ports with a stacking configuration. Note that the stacking feature may be enabled for the networking device.

When a stacking port is in IEEE mode, it may be up. This stacking port may send a negotiation packet to the other end. The packet content may include an egress port of the packet, and the data structure received from the other end of the link. This data structure may initially be empty.

After receiving the negotiation packet, if the port has no stacking configuration, the packet may be discarded. Otherwise, the link information may be added to the data structure. Note that the link information may include the port numbers of both ends the unique identifiers of the networking devices, such as their MAC addresses. Moreover, the data structure may be per link.

The preceding operation may be repeated for each of the networking devices. When a networking device receives a packet with the data structure that is identical to its data structure, both ends may have successfully exchanged information. This may trigger a timer (such as, e.g., a few seconds) to change the port to a HiGi mode. The delay may ensure that the port remains in an IEEE mode for a few seconds in order to make sure that the other end can receive any remaining packets.

When the timer triggers, the networking device may program the stacking port to a HiGi mode. Note that the port may keep sending probe packets periodically.

If the newly programmed HiGi mode does not receive anything for a specific period (such as, e.g., 10 seconds), it may mean that the other side failed when moving to the HiGi mode. In this case, the port may fall back to the IEEE mode, and the port may restart the link negotiation.

Moreover, if a port received the negotiation packet when it is in the HiGi mode, the other side has successfully moved to the HiGi mode and both ports can communicate well. Consequently, when this occurs, the port may stop sending frequent negotiation packets. Instead, the port may send infrequent keep-alive (heart beat) messages. If a HiGi port does not receive a keep-alive message in a long time (such as, e.g., one minute), the port may fall back to the IEEE mode, and may repeat the link negotiation.

Zero-touch provisioning may use topology discovery to probe its neighborhood. Then, the master may have detailed port-connection information between networking devices. Therefore, the master can configure each networking devices based on the topology.

In some embodiments, there may be several kinds of topology discovery techniques. Notably, each of the networking devices may send probes to direct neighbors to find link information. Then, the data may be aggregated and sent in the probes. After some number of packet exchanges, every networking device may have a complete topology data structure.

For example, suppose that a stacking system has three networking devices. Each of the networking devices may have programmed hardware to trap the incoming probes to the local processor for processing without any hardware switching/forwarding.

Note that the potential stacking ports described in the following discussion may be configurable ports that could become stacking ports. However, they may or may not have a stacking-port configuration, and the networking device may not enable a stacking feature.

Figure 8A:
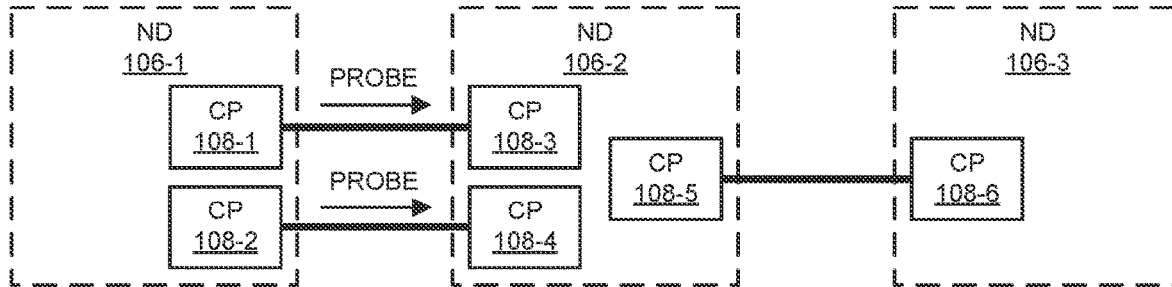

FIGS. 8A-8D present drawings illustrating examples of networking devices 106. Notably, as shown in FIG. 8A, during zero-touch provisioning an originator or master (such as networking device 106-1) may send probes to its neighbors through potential stacking ports. Each probe may include a unique identifier (such as a MAC address) of the sender, an output port and other information (such as a software version or an egress port speed). A probe may also include a link data structure of the sender, which may initially be empty. The probes may be sent periodically after topology discovery is triggered. Note that initially data structures in each of networking devices 106 may be empty.

Then, the neighbor (e.g., networking device 106-2) may receive probes from one or multiple ports. The ingress port for the probes and the unique identifier of the sender may be included in the probes. Therefore, the neighbor may add the links (networking device 106-1/port 108-1 to networking device 106-2/port 108-3 and networking device 106-1/port 108-2 to networking device 106-2/port 108-4) to its data structure. Note that a link may have two ends. Each end may include the unique identifier of a networking device and a port. Moreover, probes from a different ingress port may generate a different link. Thus, the data structure for networking device 106-2 may include two links.

Figure 8B:
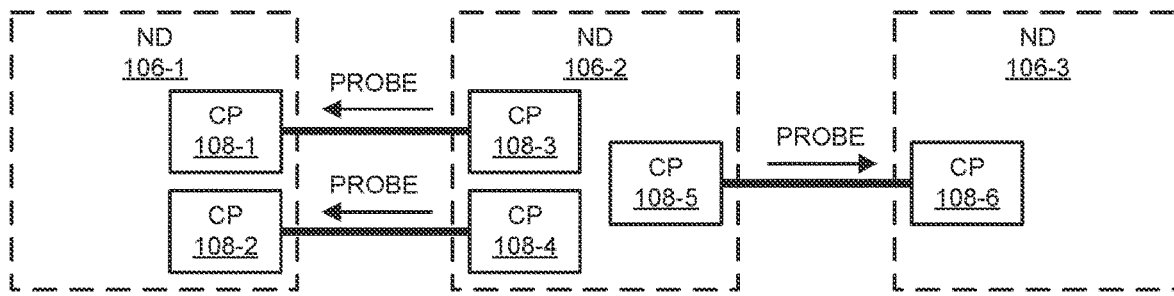

Next, as shown in FIG. 8B, networking device 106-2 may send probes to its neighbors, networking device 106-1 and networking device 106-3 through potential stacking ports (as discussed previously with reference to FIG. 8A). The probes may include the data structure for networking device 106-2 that has the two links. A non-master networking device may send probes periodically after receiving probes from the master.

Moreover, a neighbor of the neighbor (e.g., networking device 106-3) may receive probe packets. It may add links to its link data structure and may learn about the remote links. The data structure in networking device 106-3 may include links between networking devices 106-1 and 106-2 and networking devices 106-2 and 106-3: networking device 106-1/port 108-1 to networking device 106-2/port 108-3, networking device 106-1/port 108-2 to networking device 106-2/port 108-4, and networking device 106-2/port 108-5 to networking device 106-3/port 108-6. Its data structure may be complete.

Networking device 106-1 may receive probe packets from networking device 106-2. It may add links between networking devices 106-1 and 106-2 based at least in part on the probe to its data structure. For example, networking device 106-1 may include two links in its data structure: networking device 106-2/port 108-3 to networking device 106-1/port 108-1 and networking device 106-2/port 108-4 to networking device 106-1/port 108-2. It may not use the link between networking devices 106-1 and 106-2 in the probe content. Thus, each of networking devices 106 may construct local links from the probe ingress port, and may learn remote links from the probe content.

Figure 8C:
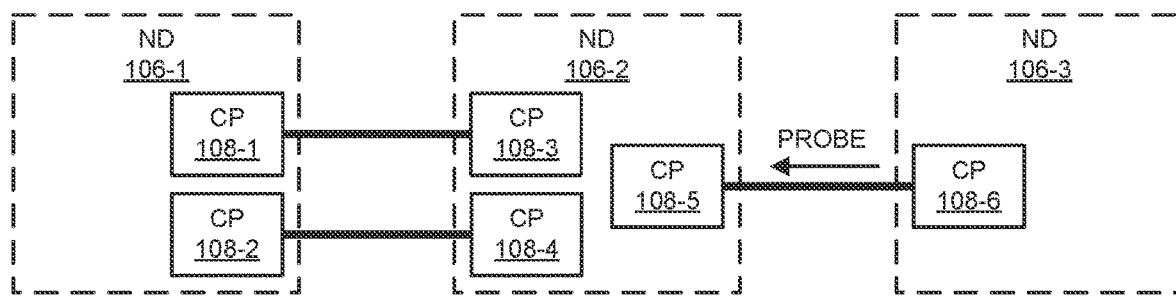

Furthermore, as shown in FIG. 8C, networking device 106-3 may send a probe to its neighbor, networking device 106-2. Therefore, networking device 106-2 may add a link between networking devices 106-3 and 106-2 to its data structure (i.e., networking device 106-3/port 108-6 to networking device 106-2/port 108-5). Now its data structure contains links between networking devices 106-1 and 106-2 and networking devices 106-3 and 106-2.

Figure 8D:
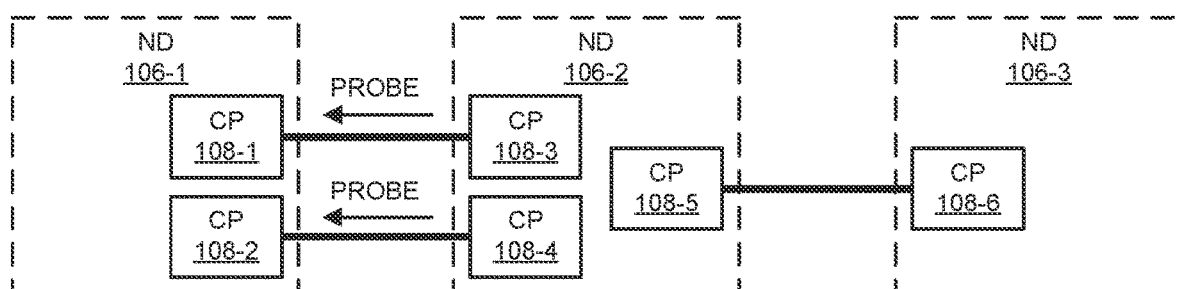

Additionally, as shown in FIG. 8D, networking device 106-2 may send probes with its data structure to networking device 106-1. After receiving the probe from networking device 106-2, networking device 106-1 learns about remote links between networking devices 106-3 and 106-2. Its data structure includes links between networking devices 106-2 and 106-1 and networking devices 106-3 and 106-2. For example, networking device 106-1 may add a new link to its data structure: networking device 106-3/port 108-6 to networking device 106-2/port 108-5. Note that there may not be a distinction between the directions of the links. They may simply be treated as bi-directional. Then, every networking device may have the same complete topology.

After a certain number of probes, depending on the maximum number of networking devices 106, every networking device may have a complete topology data structure. In some embodiments, every networking device may know that the probing is completed, instead of waiting for a certain number of probes.

Note that the directions of the links in the preceding discussion are for illustrative purposes. The configuration techniques can treat them as bi-directional. Then, the data structures in networking devices 106 may be the same. Alternatively, in some embodiments, the configuration techniques may ensure that the links are really bi-directional before completing the topology discovery.

Once each of networking devices 106 has a complete topology discovery, the probing can be discontinued (until a subsequent instance of the topology discovery).

In some embodiments, there may be enhancements of topology discovery. Note that the master may originate the probe. Other networking devices may send probes periodically after receiving a probe from the master. Moreover, the probe packet type may have high priority, because communication chips may support a quality of service (QoS) that allows certain types of packets to be sent/received with high priority.

Furthermore, each of networking devices 106 may be able to detect that the topology has been determined. Notably, when a networking device receives a probe, it may compare its entire data structure with the data structure from its neighbor in the probe. If they are identical, regardless of link directions (such as left or right), this networking device may conclude that it has the same state as its neighbor. It may add an indication in this regard to its data structure, which may be communicated to its neighbors in subsequent probes. Thus, each of networking devices 106 may know the states of networking devices 106 because these states are aggregated in the data structures in the probes. Additionally, each of networking devices 106 may know that the topology discovery is complete when networking devices 106 reach the same state. Then, networking devices 106 may stop sending probes.

Note that if a production networking device receives a probe, it may drop the probe and take no further action. This may prevent a production networking device from being inadvertently annexed to a stack. Note that a 'production networking device' may include a networking device with a non-default setting.

In some embodiments, a potential stacking port may include: potential stacking ports that have no data port configuration; and/or configured stacking ports that have no stack neighbors (this may include the ports on the master and stack members). Alternatively or additionally, a potential stacking port may exclude: ports that have data port configuration (such as a VLAN or another configuration); and/or configured stacking ports that link to stack neighbors (this is because the other end may already be a stack member, so there is no need to probe).

After zero-touch provisioning is completed, a master may send stacking-port configurations to the discovered networking devices, so they can join the stack. Therefore, there may be a need for reliable communication from the master to a networking device that could be several hops away.

The communication may be similar to the communication during topology discovery. For example, messages from the master may be relayed hop by hop to reach the networking devices. The packet may use the same destination MAC address as the probe packet, so the packet may have high priority and the receiver may always trap it in the local processor for processing.

Because the message from the master is relayed hop by hop to reach the networking devices, the master can optionally put the messages to the networking devices in the same packet. Each of the networking devices may extract the message destined to it from the broadcasted packet. Note that the communication may be between the master and the discovered networking devices. The configuration techniques may not support communication between the discovered networking devices.

If a packet is lost during the communication, some of the networking devices may not receive the message. This scenario may be addressed by the following communication technique. Note that the communication technique may work in any topology in which a networking device has two or more neighbors. (In a legitimate linear or ring topology, a networking device may have up to two direct neighbors.)

Notably, in the communication technique, a master may include messages to the networking devices in the same packet, and may send it out to its direct neighbors. Note that the master may have the complete data structure of the networking devices. Therefore, it may know which ports to use. The packet may include a trace that initially contains or includes the master.

After the neighbor receives the packet, if the neighbor is in the trace, the packet may be dropped because the connection may be looped. Otherwise, the neighbor may extract the message destined to it. Then, the neighbor may duplicate another packet and may send it to other direct neighbors, excluding the master. Because the networking devices have the complete topology, the neighbor knows which ports to use. As this point, the packet may include the original master messages and a new trace that contains the master and the neighbor.

When the next neighbor receives the packet, it repeats the preceding operations. If it has no other neighbors, then it stops sending the packet. Alternatively, if the next neighbor has other neighbors, it may send the packet with a new trace that contains, the master, the neighbor and the next neighbor.

Note that trace in the packet may have one or more purposes. It can prevent looping. Notably, if a receiver finds the trace contains itself, the packet is dropped. Alternatively or additionally, the trace may be used so that a networking device can send an acknowledgement back to the master in order to achieve reliable communication (e.g., the trace may indicate the path that the packet has taken in the stack).

While the preceding discussion illustrated topology discovery using unicast communication between networking devices, in other embodiments the probes may be broadcast to multiple networking devices.

In some embodiments, reliable communication from the master to every networking device can be achieved using retransmissions and acknowledgements. Notably, the master may retransmit a packet or a message periodically until it receives acknowledgements from the recipients. Note that this communication technique may supplement the unreliable messaging communication technique described previously.

In particular, the packets from the master may have a unique identifier or serial number. A recipient may record at least the last serial number it receives, so it can ignore the message in the retransmitted packet. However, the recipient still may need to duplicate the packet and send it in the other direction. Consequently, neighbors in the other direction may not have received the message yet.

When a networking device receives a message, regardless of whether it is retransmitted or not, it may send an acknowledgement back to the master. The acknowledgement may include the serial number and the unique identifier of the sender. Moreover, the acknowledgement packet may include the trace from the original message, so the acknowledgment can find its way back to the master. If the master does not receive acknowledgements from the recipients within a certain time interval, the message may be retransmitted with the same serial number. In some embodiments, there may be an upper limit for the number of retransmission times.

In some embodiments, a valid-stacking-port set and a linear-port set for two networking devices may be defined for a stacking system. The valid-stacking-port set may specify the potential stacking ports in two directions. In general, a stacking system may have one or more sets. The linear-port set for two networking devices may allow users to define the ports in both directions or in one direction. Note that a stacking system may include zero or more linear-port sets for two networking devices.

Regarding port notation, a stacking system may include multiple networking devices. Each networking device may include multiple modules. Therefore, in the configuration techniques, the port notation may be unique identifier/module/port.

Moreover, a valid stacking-port set may be used to define the configurable stacking ports. Each set may define the starting port for the two directions and the maximum number of ports per direction. This means that a link aggregation group may include continuous ports starting from the port defined in the set.

Suppose port y/z refers to a port that is on module y that has port number z. A valid stacking-port set may include: port 1, range 1, port 2, and range 2. For example, a set of (2/1, 3, 2/4, 3) means one direction must start from port 2/1 with up to three ports, and the other direction must start from port 2/4 with up to three ports. Therefore, one direction may have four possibilities (none, 2/1, 2/1 to 2/2, 2/1 to 2/4) or (none, 2/4, 2/4 to 2/5, 2/4 to 2/6). Consequently, this set may define 16 (4×4) stacking-port combinations for both directions. Note that both directions with no ports are not allowed if the stacking feature is enabled. This leaves 15 combinations for the set.

The set may be used to constrain the configuration for the user in order to avoid errors, such as configuring non-qualifying ports, pairing ports of different speeds, or pairing ports at different locations. For example, front panel ports and back panel ports can be in different sets, so a user can choose either front ports or back ports, but may not mix both.

In order to provide good flexibility, a stacking system may support multiple sets. For example, a stacking system may support six sets that allow selection based at least in part on bandwidth, port location and/or long-distance optics. Note that the ports in the sets may overlap, and both directions may come from the same set.

In some embodiments, three of the six valid sets for a stacking system are: (2/1, 3, 2/4, 3), (3/1, 3, 3/4, 3), and (2/1, 6, 3/1, 6). These valid sets may allow a user to choose stacking ports on module 2, module 3, or from both modules. Let (p1, p2) indicate the first stacking ports of both directions. (2/1, 2/4), (3/1, 3/4) and (2/1, 3/1) are legitimate. However, (2/4, 3/4) is illegitimate, because it comes from different sets.

The valid stacking-port set may be general and flexible. Note that the sets may have common ports. Moreover, dedicated stacking-port designs may be considered to be a special case of one set with a fixed number of ports.

A valid linear-port set for two networking devices may include: port 1, range 1, port 2, and range 2. A linear-port set for two networking devices may have the same format as a valid stacking-port set. It may allow a user to define the ports from both direction into one direction. It is usually equal to one valid stacking-port set, and may not define a new stacking port.

The linear-port set for two networking devices may allow a link aggregation group containing ports from two modules. For example, a linear-port set for two networking devices may be (2/1, 6, 3/1, 6). This may allow a stacking link aggregation group of 12 ports (2/1 to 2/6 and 3/1 to 3/6). Note that a valid stacking-port set may not allow a stacking link aggregation group that contains two modules.

In some embodiments, a networking device in some stacking systems may not support a linear-port set for two networking devices. For example, some stacking systems may have two integrated circuits, and the stacking ports may be in both of the integrated circuits. However, the hardware may require that ports in a stacking link aggregation group be in the same integrated circuit. Note that a stacking link aggregation group may be different from a data-port link aggregation group in that it allows its ports to be spread over multiple integrated circuits in different networking devices.

Moreover, a linear topology may be preferred over a ring topology in a stack with two networking devices. Consequently, a linear-port set for two networking devices may put ports in both directions in a direction. This may double the bandwidth of the stacking ports as compared to a ring topology in a stack with two networking devices.

Figure 9A:
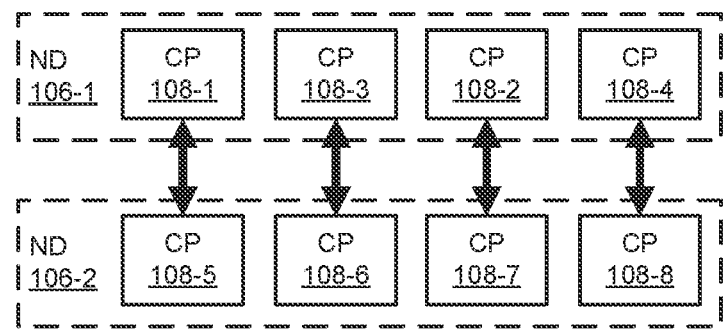
Figure 9B:
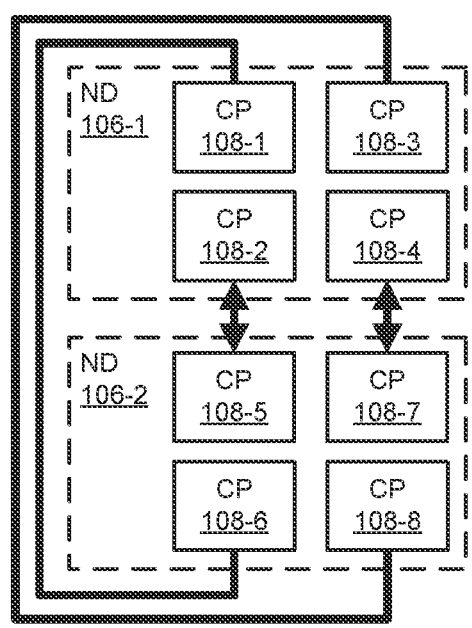
Figure 9C:
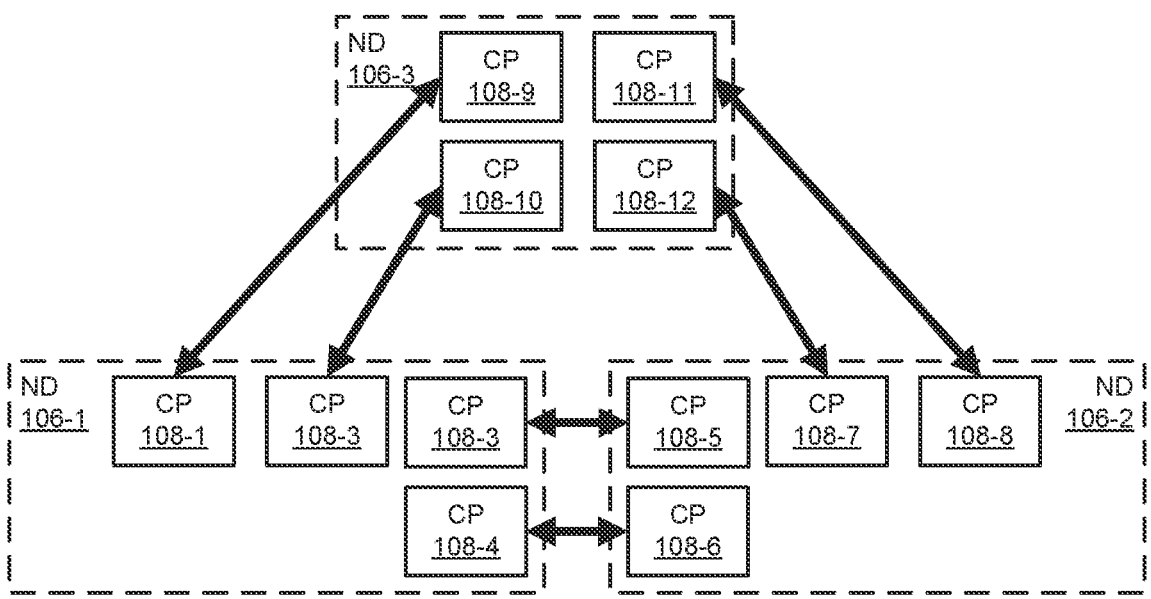

FIGS. 9A-9C present drawings illustrating examples of networking devices 106. Notably, FIG. 9A shows a linear topology with four stacking ports, and FIG. 9B shows a ring topology with four stacking ports. The linear topology may include a link aggregation group of four ports in a single direction. The ring topology may include two link aggregation groups of two ports each in two directions.

Note that the problem with a ring topology in a stack with two networking devices is that half of the stacking-port bandwidth may not be used. Notably, because there are two networking devices, and the hardware may select one direction to reach the other networking device, the other direction may not be used. In FIG. 9B, networking device 106-1 may use a second direction to reach networking device 106-2. However, as a consequence, the stacking ports in the first direction may not be used. The ports in the first direction may be useful when both ports in the second direction fail. In contrast, as shown in FIG. 9C, with three networking devices 106, each of networking devices 106 may use a different direction to reach the other two networking devices based at least in part on the shortest path, so both directions of any networking device may be fully utilized.

Moreover, FIG. 9A shows that the four ports in a link aggregation group are fully utilized. Therefore, the stacking ports provide twice the bandwidth of those in FIG. 9B, while providing the same resilience. Note that the link aggregation group may work as long as at least one port is up.

In some embodiments, the linear-port set for two networking devices may allow a stacking link aggregation group to have very high bandwidth. For example, twelve 40 Gbps stacking ports may be put into a link aggregation group in order to achieve a 480 Gbps switching throughput in a stack with two networking devices.

The zero-touch provisioning may be manually trigged. Alternatively or additionally, zero-touch provisioning may be triggered periodically once this feature is configured. If cabling requires a lot of time (such as in a large stacking system), a user may be recommended to finish the cabling before triggering zero-touch provisioning. The zero-touch-provisioning trigger period may, e.g., range from a few minutes to more than 10 minutes. If the zero-touch-provisioning period is long, it can be accelerated after some conditions occur. For example, zero-touch provisioning may be triggered in two minutes after detecting potential stacking ports going up. In general, a potential stacking port going up can reset the trigger time, e.g., to two minutes. This may prevent triggering of zero-touch provisioning while a user is still cabling a stacking system.

Figure 10A:
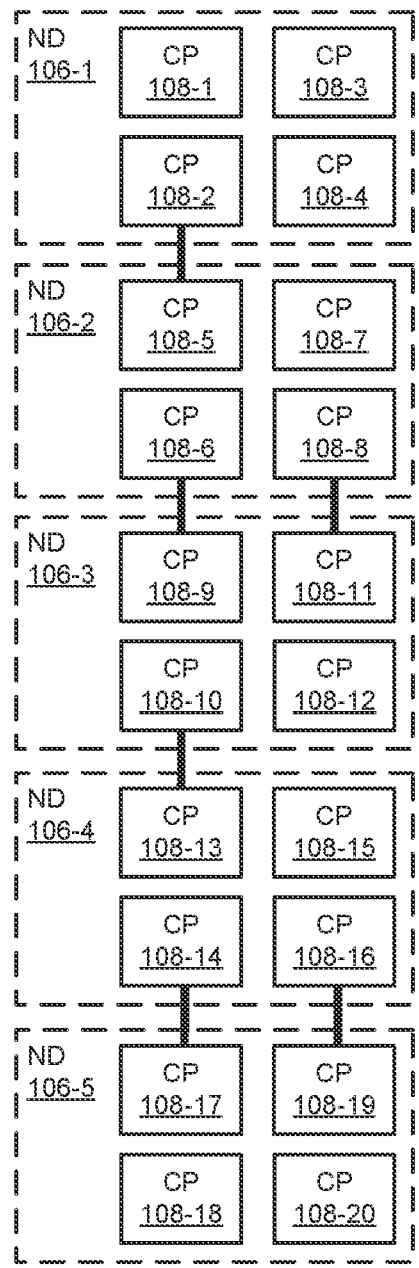
Figure 10B:
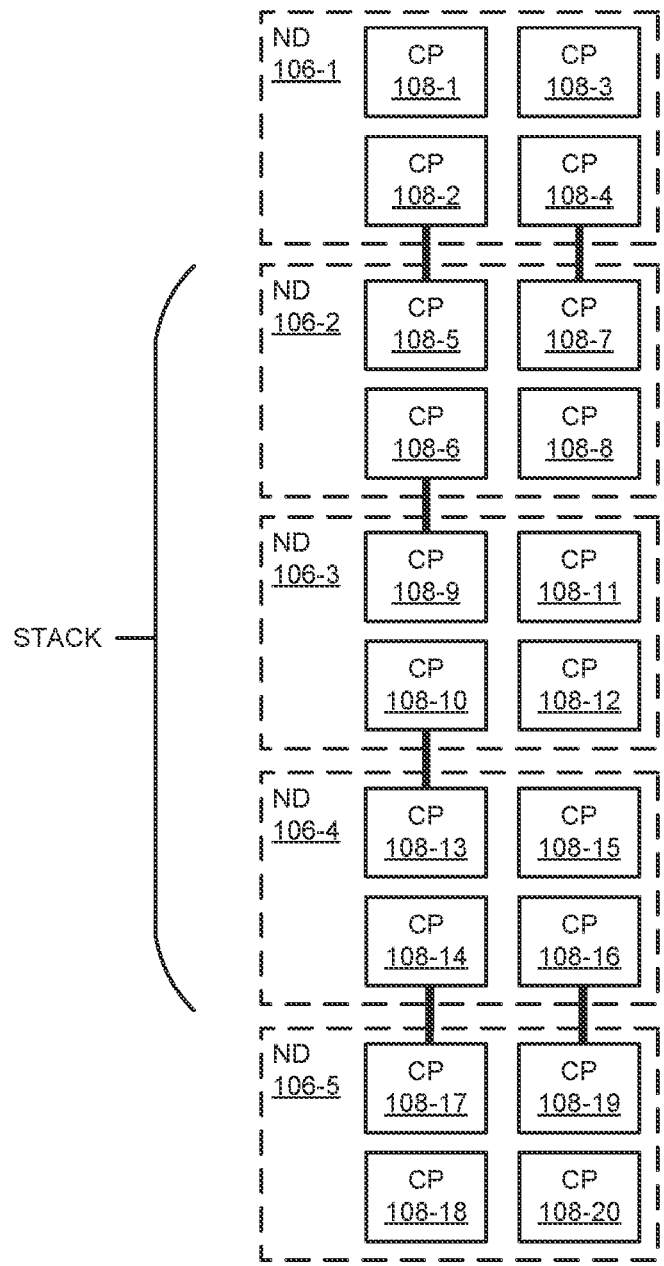
Figure 10C:
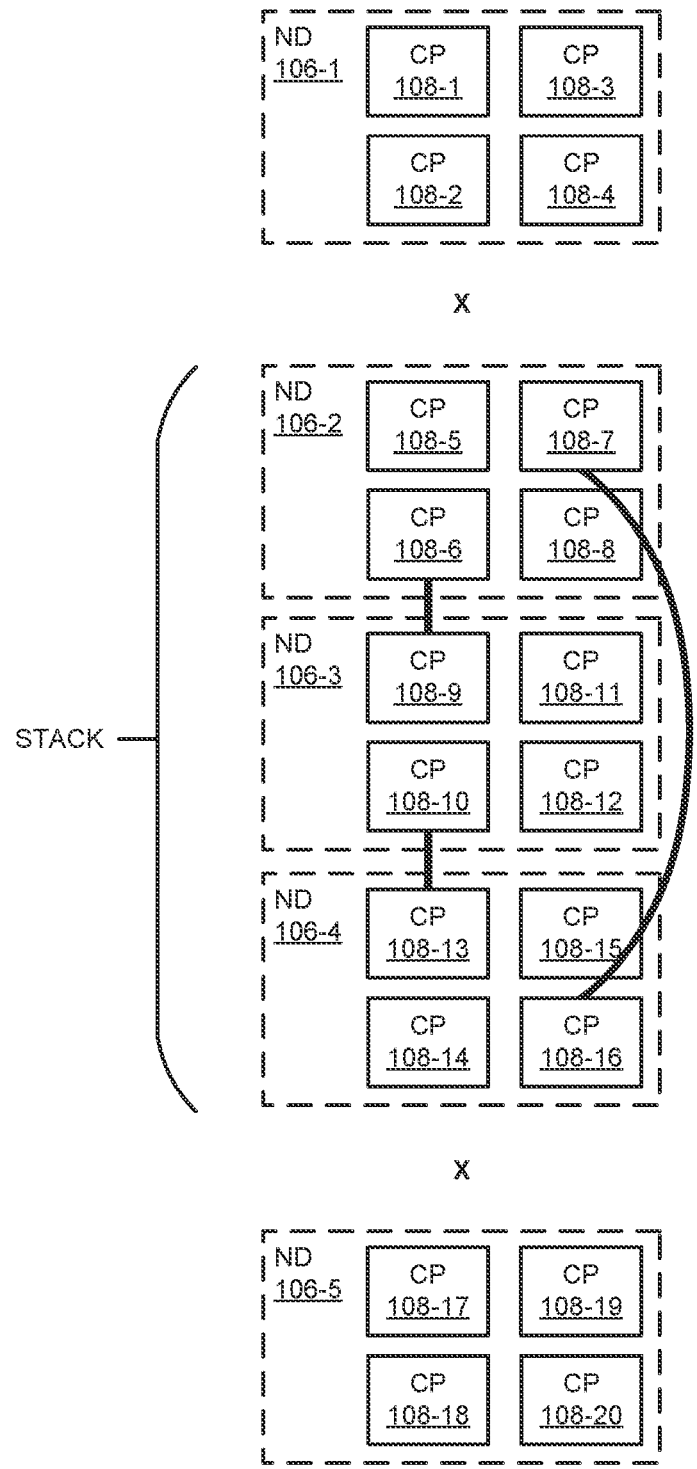

As shown in FIGS. 10A and 10B, which present drawings illustrating examples of networking devices 106, zero-touch provisioning may work when a new networking device is added to a standalone networking device or to a stacking system. For example, for a stacking system, the new networking devices may be added at the ends of the stack. However, as shown in FIG. 10C, which present a drawing illustrating an example of networking devices 106, zero-touch provisioning may not apply to new networking devices in a stack with a ring topology. This is because this topology does not have an end networking device.

After a user has finished cabling a stacking system, the following operations may be performed during zero-touch provisioning. Notably, zero-touch provisioning may use topology discovery to obtain detailed connection information for new links or connections. The topology discovery, however, may not probe live links between networking devices in a stack.

For example, the standalone master (networking device 106-4) in FIG. 10A may send probes out of the ports defined by the valid stacking-port sets. These ports may contain configured stacking ports. However, they may exclude: ports that have data-port configurations (because a user already designated them as data ports); and/or ports that are down. Alternatively, as shown in FIG. 10B, a master (networking device 106-4) may send probes out of the ports defined by the valid stacking-port sets of the two edge networking devices 106-2 and 106-4. These ports may contain configured stacking ports for the edge networking devices 106-2 and 106-4. The ports may exclude: ports that have data-port configurations; ports that are down; and/or ports that are in a HiGi mode (which are live stacking ports to other networking devices).

Note that zero-touch provisioning may send probes to the two edge networking devices 106-2 and 106-4. Zero-touch provisioning may not apply to a stack with a ring topology because it may not have any edge networking devices where a new networking device can be added. However, zero-touch provisioning may be modified to detect new links between networking devices if it sends probes regardless of edge or non-edge networking devices. This may apply to a linear or ring topology.

Moreover, each probe may include the unique identifier (such as a MAC address) of the master, an output port, and/or other information. Furthermore, the master may send probe packets directly out of the ports of a member, and new networking devices may receive the probe packets.

In general, a new networking device may not have a configuration. However, a networking device that is configured for cloud management may be considered as a new networking device. In this case, the cloud management may configure a command for the networking device to receive the probe(s) even if it already has a configuration. Moreover, a user may change the default speed configuration of stacking ports. Nonetheless, such a networking device may still be considered to be a new networking device. Note that if a networking device that is not a new networking device receives a probe packet, it may drop it without further processing or forwarding.

When a new networking device receives a probe packet, it may set up an access list (ACL) to drop the packets except a few predefined packet types. These packets types may include a probe packet type, a cloud-management packet type, a spanning tree protocol (STP) packets, and/or another packet type. The remainder of the packets may be dropped. Note that the ACL may apply to every port. This may stop L2 looping.

Moreover, when a new networking device receives a probe and starts topology discovery, it may also set up a timer triggered in, e.g., a few minutes in order to perform clean up (such as removing the ACL and/or freeing software resource for zero-touch provisioning). This may ensure a return to a normal operating mode or condition when zero-touch provisioning ends. For example, the master may send messages to the networking devices in a stack to clean up after finishing zero-touch provisioning. Note that the timer may be triggered if a networking device does not receive a clean-up message from the master.

As discussed previously, after topology discovery, the master may know the detailed link or connection information, as well as the networking devices in a stack. Then, the master may classify links into groups between two networking devices. Moreover, the master may perform sanity checks in order to determine the validity of the determined or discovered topology. If the topology is invalid, zero-touch provisioning may reject the topology, and may provide one or more warning messages to indicate the problem. Next, the master may send commands to the networking devices to clean up. Note that zero-touch provisioning (or the configuration techniques) may be triggered again periodically.

Figure 11A:
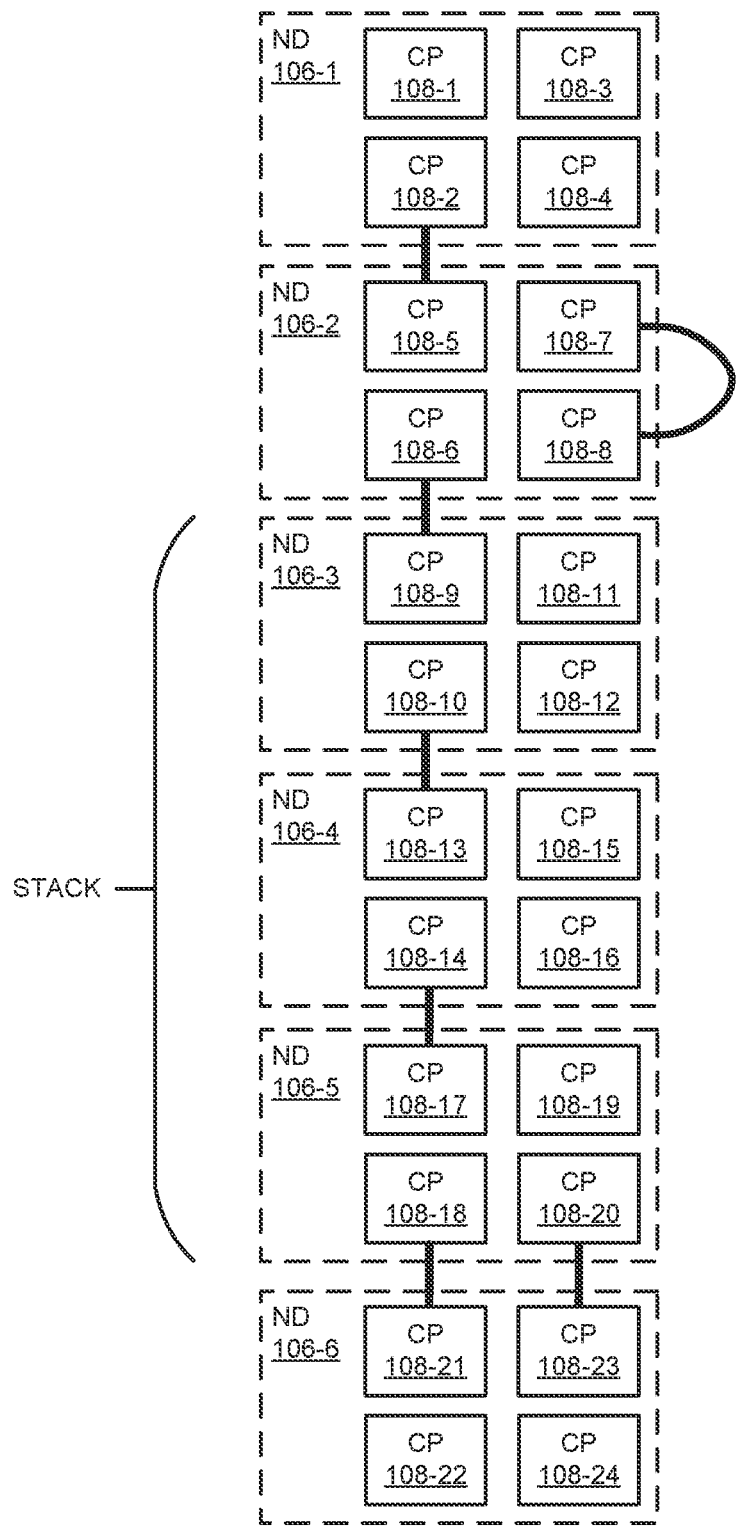
Figure 11B:
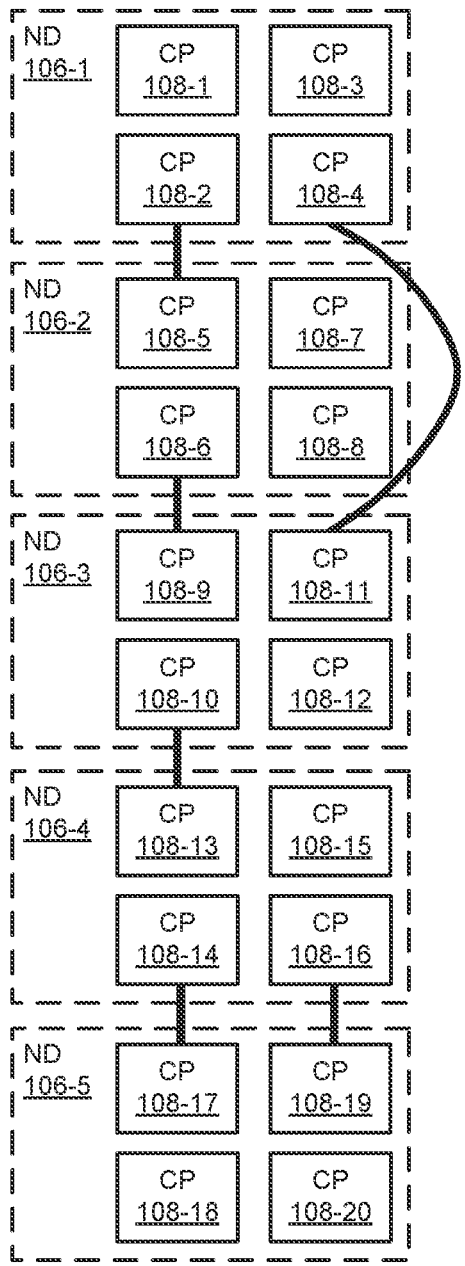
Figure 11C:
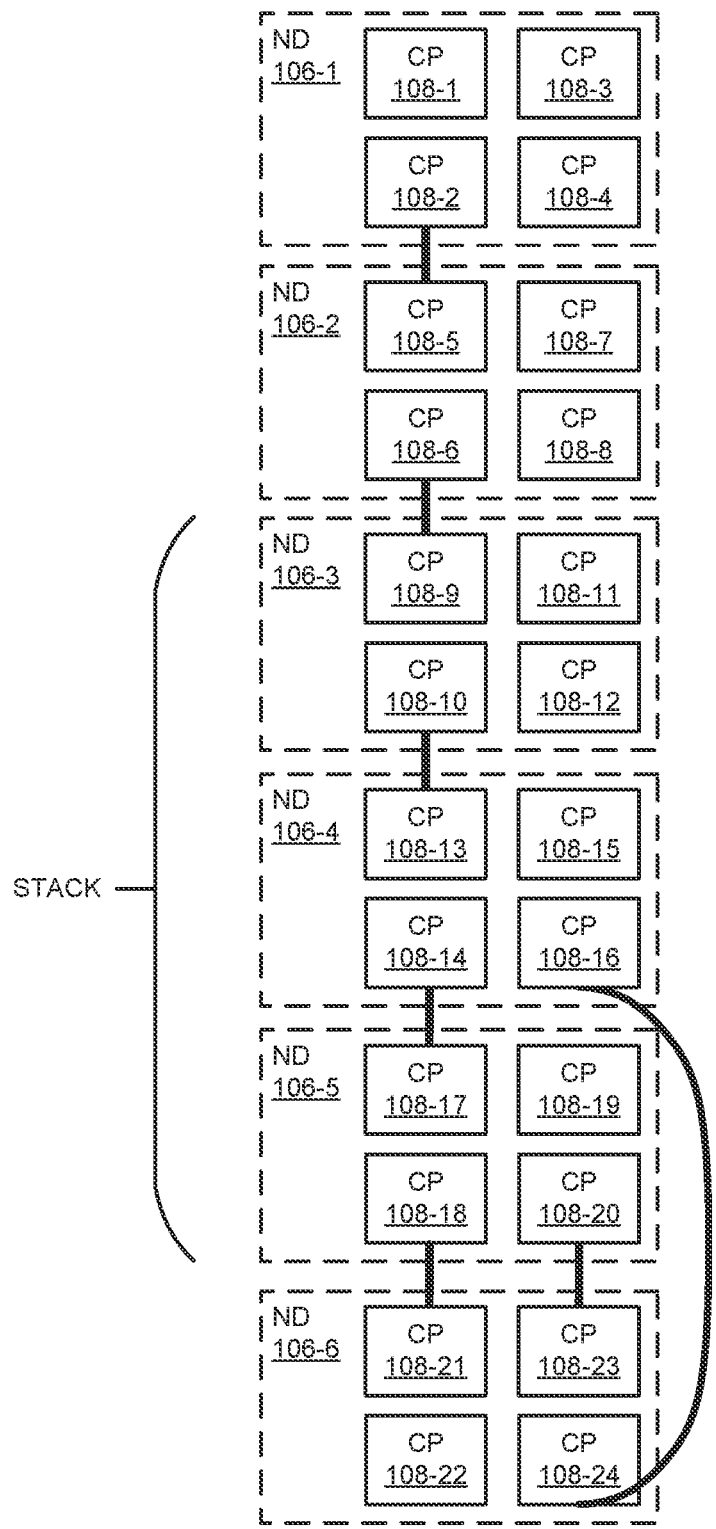

Indications of topology invalidity may include if both ends of a link are on the same networking device. Moreover, a link topology may be invalid if a networking device has links to three or more networking devices (because a networking device may have links to one or two networking devices). The preceding rule may consider the existing networking devices. A non-end networking device may already be linked to two networking devices. If a new networking device links to a non-end networking device in a stack, it may make the non-end networking device link to three networking devices. Although the non-end stack networking device does not send probes, it may receive probes from a new networking device, and it may detect a link. Furthermore, a link topology may be invalid if the number of discovered networking devices plus the number of networking devices in the stack exceeds a limit on the maximum number of networking devices in a stack. FIGS. 11A-11C present drawings illustrating examples of networking devices 106 with invalid topologies.

After performing the sanity checks on the validity of the topology, the master may perform sanity checks based at least in part on valid stacking-port sets. Notably, while the preceding topology sanity checks can detect networking device-to-networking device errors, they may not detect link-to-link errors. Link-to-link errors may be detected by comparing the link information with the valid stacking-port sets.

For example, suppose the total number of networking device is greater than two. Each networking device, except the two end networking devices, may have two neighbors. The detected links of a networking device may be classified in two directions based at least in part on the neighbors. Moreover, each direction may be to a different neighbor. The ports of both directions may be compared with the valid stacking-port sets.

In some embodiments, if the total number of networking devices is two, the links may be between the two networking devices. Moreover, the links may be divided into two directions to form a ring topology or put in one direction to form a linear topology. Moreover, in some embodiments, a stacking system may have 12 potential stacking ports and six valid stacking-port sets. These sets may include: (2/1, 3, 2/4, 3), (3/1, 3, 3/4, 3) and (2/1, 6, 3/1, 6).

For example, a networking device may have one direction of ports 2/1 and 2/3 and another direction of ports 3/1, 3/2 and 3/3 that satisfy the (2/1, 3/1, 6) set. Alternatively, if the second direction is changed to 3/4, 3/5 and 3/6, there may not be a single set that satisfies both directions. (While each direction satisfies some sets, they do not satisfy the two directions of a single set.)

Figure 12A:
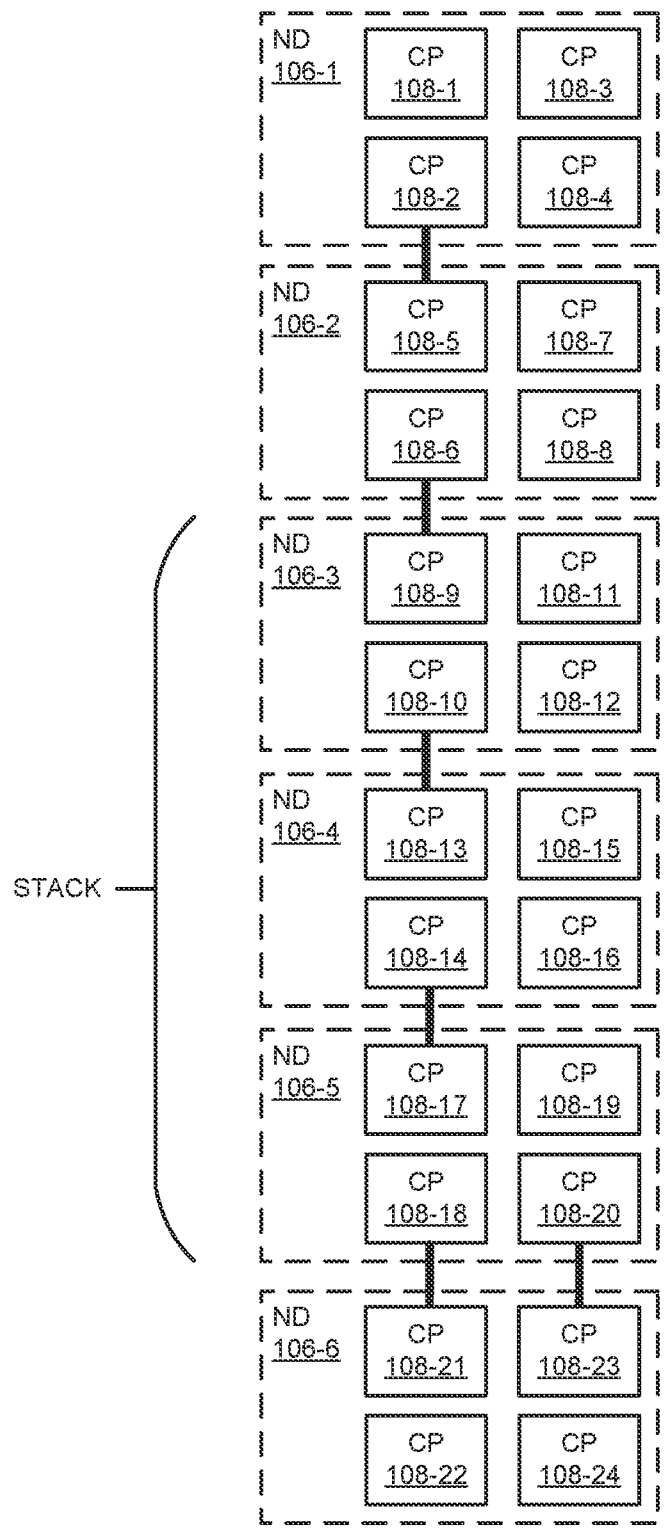
Figure 12B:
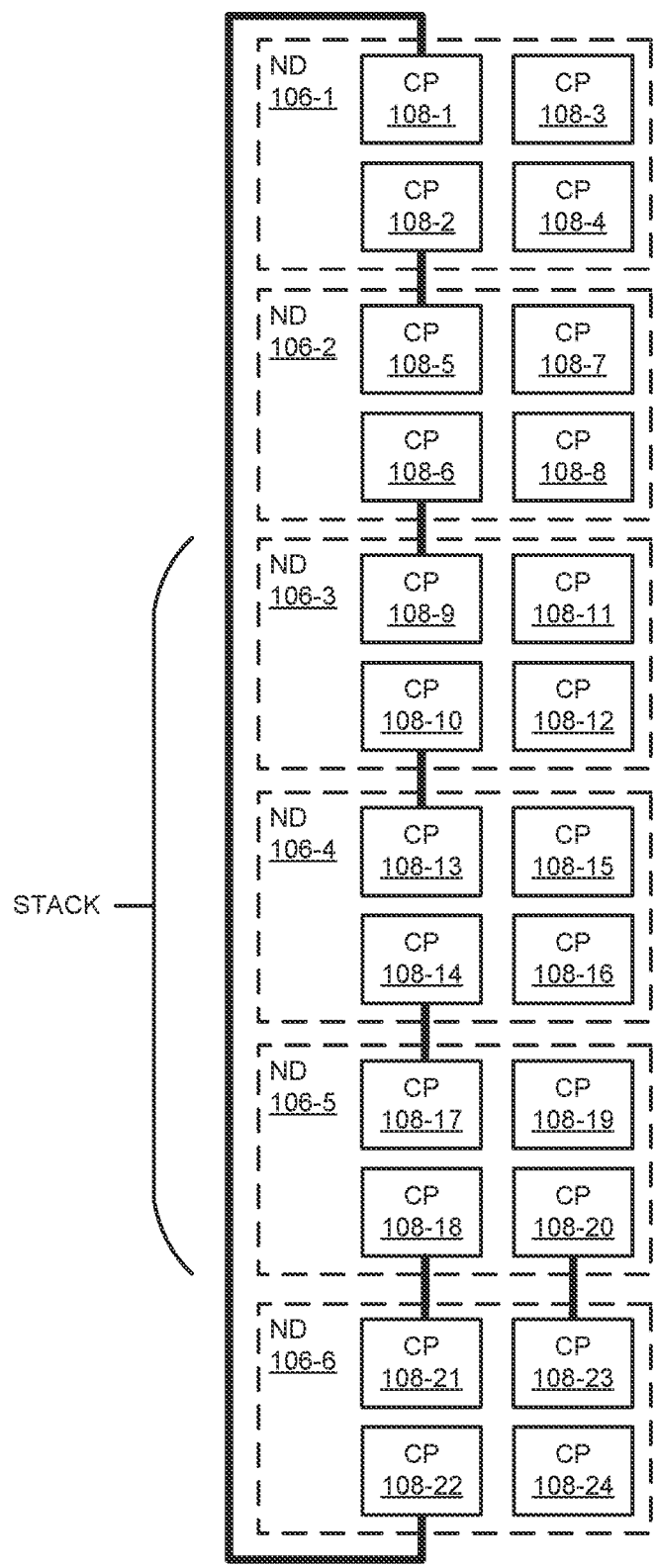
Figure 12C:
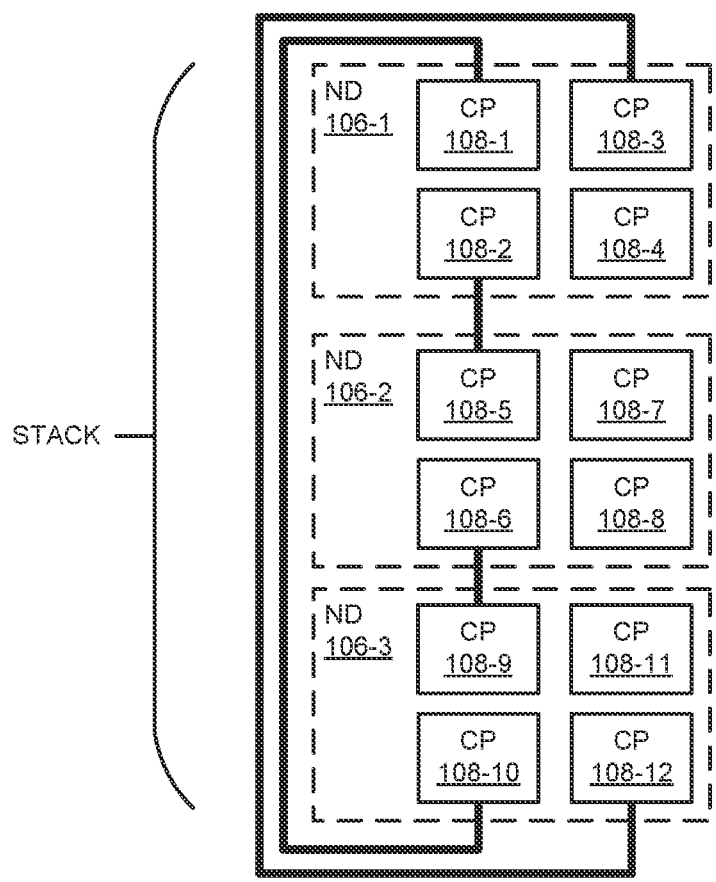

As shown in FIGS. 12A-12C, which present drawings illustrating examples of networking devices 106, there may be several embodiments of a networking device with one or more new links. Notably, when an end networking device has one neighbor, it has one direction and can match either of the directions of a valid stacking-port set. For example, new networking devices 106-1 and 106-6 in FIG. 12A are end networking devices. Moreover, networking device 106-2 is an example of a new networking device that has two directions to two neighbors, and both directions may match the directions of a valid stacking-port set.

Furthermore, a networking device may have new links to a new networking device or to another networking device. Note that a new direction may include the new links. If the master has stacking-port configurations for this direction for this networking device, the configured stacking ports may be ignored. The other direction may include the configured stacking ports that have a live networking-device neighbor.

For example, networking device 106-3 in FIG. 12A may have two stack link-aggregation-group configurations of (2/1, 2/2) and (3/1, 3/2). The direction (2/1, 2/2) may have a live neighbor (networking device 106-2) in the stack. Moreover, the port to the new networking device 106-2 is 2/4. Then, the configuration (3/1, 3/2) may be ignored, because it uses (2/4) and (2/1, 2/2) as two directions when compared with a valid stacking-port set.

Additionally, as shown in FIG. 12B, discovery of networking devices 106-1, 106-2 and 106-6 may also discover new links in a ring topology. Alternatively, as shown in FIG. 12C, the discovery of new links between end networking devices 106-1 and 106-3 may discover a ring topology without any new networking devices.

While users may need flexibility to effectively use configurable stacking ports to meet different requirements, too much flexibility may result in more user mistakes, and a stacking system may become difficult to troubleshoot. Therefore, some restrictions may be implemented to reduce user mistakes.

For example, the ports in a stacking link aggregation group may be contiguous (such as from 2/4 to 2/6), and may be started from a specific port defined in the valid stacking-port set. This may make it easier for users to cable and troubleshoot. Note that this may not be a hardware restriction. Instead, it may be a usage restriction.

Moreover, the first port of a direction in the valid stacking-port set may need to be physically connected to match the set. This may reduce a matching ambiguity. For example, in order to simplify matching, the first port of a valid stacking-port set may need to be physically connected. Suppose a first networking device has ports 2/1 and 2/2 to a second networking device, and ports 3/1 and 3/3 to a third networking device. Then, the networking devices may match a (2/1, 6, 3/1, 6) set. Note that ports 2/1 and 2/2 are subset of 2/1 with up to six contiguous ports, and ports 3/1 and 3/3 are subset of 3/1 with up to six contiguous ports.

Suppose a further networking device has one direction. It may have ports 2/1 and 2/3 to a fifth networking device. Then, the links may qualify in sets (2/1, 3, 2/4, 3) and (2/1, 6, 3/1, 6). Moreover, both of these sets may have the same effect, because a stack link aggregation group containing ports 2/1, 2/2 and 2/3 may be generated, even though port 2/2 is not linked (because contiguous link-aggregation-group ports may be required).

Requiring that the first port of the set has a physical connection may reduce ambiguity. For example, a networking device may have ports 2/4 and 2/6 to one neighbor. Without the first port requirement, it can match the second direction of set (2/1, 3, 2/4, 3) and the first direction of set (2/1, 6, 3/1, 6). The first set may generate a link aggregation group of three contiguous ports (2/4 to 2/6). The second set may generate a link aggregation group of six contiguous ports (2/1 to 2/6). With the physical first port requirement, the second set does not qualify because port 2/1 has no physical link.

Thus, new networking devices and the edge networking devices of the stack that detects new links may need to match both directions of at least one valid stacking-port set. For the edge networking device, one direction may include the existing configured stacking ports, and the other direction may include the new links.

If a networking device with new links does not qualify a valid stacking-port set, then the connection is invalid. In response, the zero-touch provisioning may stop and an error message with the reason may be provided, so that a user can make corrections. Then, zero-touch provisioning may send clean-up messages to the networking devices. Alternatively, if a networking device qualifies multiple valid stacking-port sets, the master can choose one. However, for a particular module in many stacking systems, there may be one valid stacking-port set. In addition, the valid stacking-port sets may be defined so that there is a unique or exact match.

In some embodiments, there may be additional restrictions when the networking devices each qualify at least one valid stacking-port set. These additional restrictions may be required or optional. When a required restriction is violated, zero-touch provisioning may abort, and an error message with the reason may be provided so a user can take corrective action. Then, zero-touch provisioning may send clean-up messages to the networking devices.

The additional restrictions may include that a candidate stacking port may not have a data-port configuration on a standalone master or a master in a stack. Note that the master may know the configuration of the port in the stack. Moreover, note that a user configured data port may not become a stack port via zero-touch provisioning.

For example, a networking device may detect new links on ports 2/1 and 2/3. The master may want to form a three-port stack link aggregation group of ports 2/1 to 2/3. However, if port 2/2 has a data-port configuration, the master may not generate the three-port stack link aggregation group.

Moreover, the additional restrictions may include that ports in a link aggregation group may need to have the same speed. Once again, the master knows the configured or default speed of the ports in the stack. For a new networking device, the speed information may be included in topology discovery probes.

Furthermore, the additional restrictions may include that a connection may have the same relative offsets to the first ports of a valid stacking-port set. For example, port 2/2 of one networking device can link to port 3/2 or 2/5 of another networking device, but it cannot link to port 2/3 of the other networking device. Links that use ports 2/2 to 3/2 may have the same offset of two based on the valid stacking-port set (2/1, 6, 3/1, 6). In addition, link 2/2 to 2/5 may have the same offset of two based on the valid stacking-port set (2/1, 3, 2/4, 3). Note that the hardware in the stacking system may be able to handle link aggregation groups with different offsets. Nonetheless, the same offset is a usage restriction that may be required in order to reduce connection errors or user confusion.

When the discovered topology includes two networking devices, the links are between the two networking devices. These links can either be in one direction to form a linear topology, or they can be divided into two directions to form a ring topology. A stacking system may determine whether the links (including the existing links in a linear topology for a stack with two networking devices) can be in a stacking link aggregation group. Notably, a master may check whether the links are in one direction of a valid stacking-port set. If not, the master may match the links with the linear-port set for two networking devices (some of the previous restrictions, such as the use of the first port and having the same offset may be waived). However, if a stacking system does not support any linear-port set for two networking devices, this operation may be skipped.

Moreover, the master may test whether the links can be divided into two directions. Notably, the master may identify a valid stacking-port set for the links. Then, the two directions of the set may indicate how the links are divided into the two directions. When using a valid stacking port set to divide links to two directions, the ports in a direction may go to a direction of another device. However, note that ports of a direction may not link to both directions of another device. For example, a first direction of a networking device may link to the first or the second direction of the other networking device, but not to both directions.

In general, one of three cases may result. In a first case, there may not be a valid stacking-port set or a valid linear-port set for two networking devices. In this case, zero-touch provisioning may fail. An error message with a reason may be provided, and a clean-up command may be sent to the networking devices. In a second case, either a valid stacking-port set or a valid linear-port set for two networking devices is found, and the master uses the valid set. In the third case, a valid stacking-port set and a valid linear-port set for two networking devices are found. Then, the master may choose to use a linear topology or a ring topology.

Figure 13A:
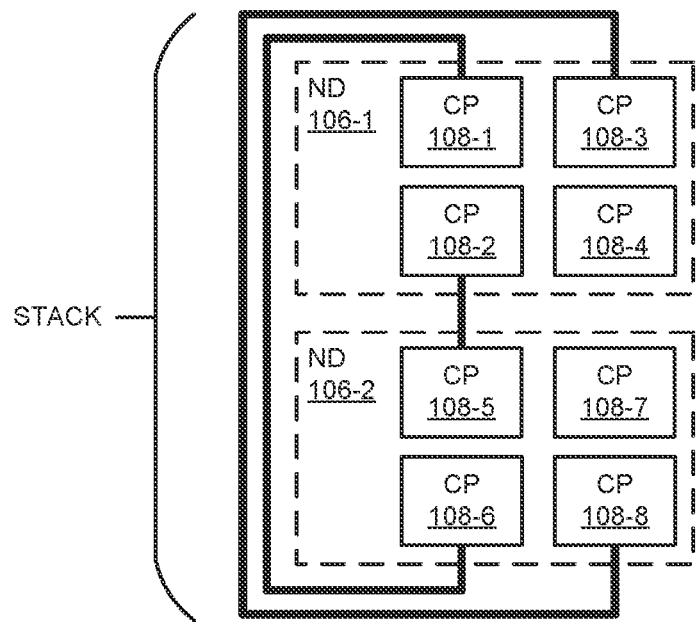
Figure 13B:
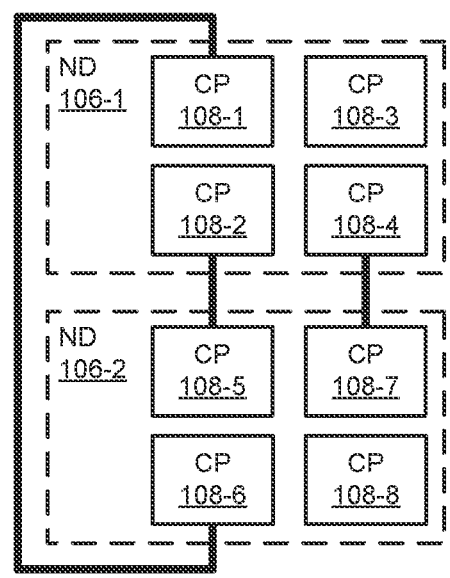

Examples of different designs and topologies are shown in FIGS. 13A and 13B, which present drawings illustrating examples of networking devices 106. Notably, FIGS. 13A and 13B present examples of stacks with two networking devices 106. In FIG. 13A, new links are discovered between existing networking devices 106. The new links may generate a ring topology. A user does not configure the new links as stacking ports, so they are not live stacking ports, and can be discovered using zero-touch provisioning. The master may decide that the user wants the ring topology. Moreover, in FIG. 13B, a new networking device 106-2 is discovered by a standalone master (networking device 106-1). The master may select a linear topology because it has higher throughput. Note that, in some embodiments, zero-touch provisioning may be an interactive tool that asks a user to select the network topology in ambiguous cases.

After performing the sanity checks on the valid stacking-port sets, the master may assign identifiers to the discovered networking devices. Zero-touch provisioning may enter this phase after it selects a valid stacking-port set or a linear-port set for two networking devices for the networking devices with new links. Then, the master may assign identifiers to the discovered networking devices. However, this operation is optional. A new networking device without an identifier may still join a stack. The master may assign it an identifier during joining. Note that the assigned identifier may depend on the joining order, and may be non-deterministic. Therefore, in some embodiments, the master may define an identifier for a new networking device at this point, because it has the network topology as a reference.

In some embodiments, identifiers may be assigned based at least in part on: the physical topology order and/or provisional configurations determined by the master. For example, the master may have provisional configuration for several networking devices with different module types. The master may assign an identifier that matches the module types of a new networking device. Note that a provisional configuration for a networking device may mean that the networking device does not exist, but its configurations (such as module types) are defined.

Then, the master may generate stacking-port configurations for the networking devices, including networking devices with new links or connections. There are a variety of ways to generate a configuration from the qualifying sets based at least in part on the restrictions. For example, if there are no contiguous ports and a first port must be linked, zero-touch provisioning may generate a stacking port or link aggregation group per direction based at least in part on the real physical connections. Alternatively, if there are contiguous ports and the first port must be linked, zero-touch provisioning may generate a contiguous link aggregation group that includes the first port to the largest port in a direction. For example, if one direction has two links with ports 3/1 and 3/4, zero-touch provisioning may generate a link-aggregation-group configuration that includes ports (3/1 to 3/4).

Moreover, a new networking device may use the generated stacking-port configuration because it has no configuration. For example, a new networking device may have links with ports 2/1 and 2/2 to one networking device, and links with ports 3/1 and 3/3 to another networking device. Consequently, its stacking-port configuration may be a link aggregation group with ports 2/1 to 2/2 and a link aggregation group with ports 3/1 to 3/3 for two directions.

In some embodiments, suppose the generated configuration is for a stacking system that has live stacking ports for one networking device. The original configuration of the direction that links to a live stack device may be maintained. However, the other direction containing a new link may be replaced or merged with the generated configuration. For example, an end networking device may have configured stacking ports of a link aggregation group with ports 2/1 to 2/2 and a link aggregation group with ports 2/4 to 2/5. It may have a live stack neighbor in the direction of the link aggregation group with ports 2/1 to 2/2. Moreover, the discovered new links may include ports 3/1 and 3/2. The old configuration of a link aggregation group with ports 2/4 to 2/5 may be replaced by a link aggregation group with ports 3/1 to 3/2. If the old configuration of the unused direction was a link aggregation group with ports 3/1 to 3/4, it may be merged and the new configuration may still be a link aggregation group with ports 3/1 to 3/4.

In general, there may be many variations in the generated stacking-port configurations. The master may have configurations for provisional networking devices. As noted previously, A provisional networking device may not physically exist, but the configuration may exist. For example, when a live networking device is removed from a stack, the master may keep its configuration in case it may come back. Thus, this networking device may become a provisional networking device because it does not physically exist. When the master generates a stacking-port configuration, it may consider or merge with the stacking-port configuration(s) of provisional devices.

After the master assigns one or more stacking-port configurations, it may send commands to new networking devices and stack networking devices about their new configurations. When a new networking device receives the command, it may configure the new stacking ports and/or the identifier, and it may set up a timer to enable stacking and joining the stack. As noted previously, the timer delay may ensure that the master has enough time to reliably communicate to other networking devices in the stack. Note that, when a new networking device joins a stack the first time, it may be reloaded to reprogram hardware.

In some embodiments, zero-touch provisioning may provide an interactive tool. This capability may allow a user to overwrite the default zero-touch-provisioning decisions. For examples, a user may choose: the number of the new networking devices that join a stack; an identifier for a new networking device; and/or a linear topology or a ring topology when there are two networking devices.

Moreover, zero-touch provisioning may detect new links between networking devices. Notably, zero-touch provisioning may be used to detect new links between existing networking devices, and then may automatically enlarge a stack link-aggregation-group configuration. For example, if a user wants to increase the bandwidth of stacking ports, new links may be added to potential stacking ports between networking devices. Then, zero-touch provisioning may detect the new links and enlarge the stack link-aggregation-group configurations.

As discussed previously, in these embodiments, a master may send or provide one or more probes. Notably, the master may send probes out of the two end networking devices of a stack with a linear topology. If the stack has a ring topology, there are no end networking devices. Moreover, the master may send probes out of the ports defined by the valid stacking-port sets of the two edge networking devices. These ports may contain configured stacking ports of the edge networking devices. However, the ports may exclude: ports that have data-port configurations; ports that are down; and/or ports that are in a HiGi mode (which may be live stacking ports to other networking devices).

Alternatively, in some embodiments, probes may be sent out of each of the networking device, not just the two end networking devices. The remainder of the configuration techniques may be similar. Moreover, the same matching and restrictions may be applied to the detect links, except the requirement that the first port must be physically connected may be waived. This is because the networking devices in the stack have live neighbors and stacking-port configurations. Each of the networking device may qualify as a valid stacking-port set. Therefore, there may not be any ambiguity, and the 'first port to be connected' may not be a requirement. Note that the existing stacking-port configuration of a networking device may be enlarged to contain the new links.

In some embodiments, the configuration techniques may automatically fix a stacking port-to-non-stacking port connection. Notably, as discussed previously, a user may make mistakes during manual configuring of the stacking ports for different networking devices. For example, a stacking port may link to a non-stacking port. Such a mismatched link cannot be used, and it may cause problems.

The ability to detect new links between networking devices in a stack may be used to automatically fix this problem and to correctly configure the stacking port on the networking device that includes the non-stacking port. Notably, the mismatched stacking port may be in an IEEE mode (as opposed to a HiGi mode), because moving to a HiGi port by link negotiation usually requires both ends to be stacking ports. Therefore, both ends can communicate and zero-touch-provisioning probes can be sent from both ports. (In general, zero-touch provisioning may not send probes to HiGi ports.) Then, the same zero-touch-provisioning procedure can detect the links and the master can modify/enlarge the stacking-port configuration to make both ends stacking ports.

The configuration techniques may make it easier to use of the stacking system via zero-touch provisioning, which detects links or connections, and configures stacking ports or link aggregation groups based at least in part on the connections to form a stack. The resulting flexibility may help users avoid unused (and expensive ports). This may allow users to make decisions based at least in part on price, bandwidth, and/or physical facility needs. Moreover, the configuration techniques may double the stacking-port bandwidth in a stack with two networking devices by using a linear topography. Furthermore, the configuration techniques may facilitate cloud-based management of a stacking system.

We now describe embodiments of an electronic device, which may perform at least some of the operations in the configuration techniques. FIG. 14 presents a block diagram illustrating an example of an electronic device 1400 in accordance with some embodiments, such as one of electronic device 104, one of access points 110 or one of recipient electronic devices 112. This electronic device includes processing subsystem 1410, memory subsystem 1412, and networking subsystem 1414. Processing subsystem 1410 includes one or more devices configured to perform computational operations. For example, processing subsystem 1410 can include one or more microprocessors, ASICs, microcontrollers, programmable-logic devices, one or more graphics process units (GPUs) and/or one or more digital signal processors (DSPs).

Memory subsystem 1412 includes one or more devices for storing data and/or instructions for processing subsystem 1410 and networking subsystem 1414. For example, memory subsystem 1412 can include dynamic random access memory (DRAM), static random access memory (SRAM), and/or other types of memory. In some embodiments, instructions for processing subsystem 1410 in memory subsystem 1412 include: one or more program modules or sets of instructions (such as program instructions 1422 or operating system 1424), which may be executed by processing subsystem 1410. Note that the one or more computer programs may constitute a computer-program mechanism. Moreover, instructions in the various modules in memory subsystem 1412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1410.

In addition, memory subsystem 1412 can include mechanisms for controlling access to the memory. In some embodiments, memory subsystem 1412 includes a memory hierarchy that comprises one or more caches coupled to a memory in electronic device 1400. In some of these embodiments, one or more of the caches is located in processing subsystem 1410.

In some embodiments, memory subsystem 1412 is coupled to one or more high-capacity mass-storage devices (not shown). For example, memory subsystem 1412 can be coupled to a magnetic or optical drive, a solid-state drive, or another type of mass-storage device. In these embodiments, memory subsystem 1412 can be used by electronic device 1400 as fast-access storage for often-used data, while the mass-storage device is used to store less frequently used data.

Networking subsystem 1414 includes one or more devices configured to couple to and communicate on a wired and/or wireless network (i.e., to perform network operations), including: control logic 1416, an interface circuit 1418 and one or more antennas 1420 (or antenna elements). (While FIG. 14 includes one or more antennas 1420, in some embodiments electronic device 1400 includes one or more nodes, such as nodes 1408, e.g., a network node that can be coupled or connected to a network or link, or an antenna node or a pad that can be coupled to the one or more antennas 1420. Thus, electronic device 1400 may or may not include the one or more antennas 1420.) For example, networking subsystem 1414 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 1414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1400 may use the mechanisms in networking subsystem 1414 for performing simple wireless communication between the electronic devices, e.g., transmitting advertising or beacon frames and/or scanning for advertising frames transmitted by other electronic devices as described previously.

Within electronic device 1400, processing subsystem 1410, memory subsystem 1412, and networking subsystem 1414 are coupled together using bus 1428. Bus 1428 may include an electrical, optical, and/or electro-optical connection that the subsystems can use to communicate commands and data among one another. Although only one bus 1428 is shown for clarity, different embodiments can include a different number or configuration of electrical, optical, and/or electro-optical connections among the subsystems.

In some embodiments, electronic device 1400 includes a display subsystem 1426 for displaying information on a display, which may include a display driver and the display, such as a liquid-crystal display, a multi-touch touchscreen, etc.

Electronic device 1400 can be (or can be included in) any electronic device with at least one network interface. For example, electronic device 1400 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a networking device, a stack of networking devices, an access point, a controller, test equipment, and/or another electronic device.

Although specific components are used to describe electronic device 1400, in alternative embodiments, different components and/or subsystems may be present in electronic device 1400. For example, electronic device 1400 may include one or more additional processing subsystems, memory subsystems, networking subsystems, and/or display subsystems. Additionally, one or more of the subsystems may not be present in electronic device 1400. Moreover, in some embodiments, electronic device 1400 may include one or more additional subsystems that are not shown in FIG. 14. Also, although separate subsystems are shown in FIG. 14, in some embodiments some or all of a given subsystem or component can be integrated into one or more of the other subsystems or component(s) in electronic device 1400. For example, in some embodiments program instructions 1422 are included in operating system 1424 and/or control logic 1416 is included in interface circuit 1418. In some embodiments, the configuration techniques are implemented using information in layer 2 and/or layer 3 of the OSI model.

Moreover, the circuits and components in electronic device 1400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1414 (or, more generally, of electronic device 1400). The integrated circuit may include hardware and/or software mechanisms that are used for transmitting wireless signals from electronic device 1400 and receiving signals at electronic device 1400 from other electronic devices. Aside from the mechanisms herein described, radios are generally known in the art and hence are not described in detail. In general, networking subsystem 1414 and/or the integrated circuit can include any number of radios. Note that the radios in multiple-radio embodiments function in a similar way to the described single-radio embodiments.

In some embodiments, networking subsystem 1414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the configuration techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the configuration techniques may be implemented using program instructions 1422, operating system 1424 (such as a driver for interface circuit 1418) or in firmware in interface circuit 1418. Alternatively or additionally, at least some of the operations in the configuration techniques may be implemented in a physical layer, such as hardware in interface circuit 1418.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the configuration techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
networking devices arranged in a stack, wherein a given networking device comprises a data plane configured to direct packets or frames in a network based at least in part on destinations of the packets or frames, a control plane configured to provide management and an internal switching fabric for the networking devices, and configurable ports, wherein a given configurable port in the configurable ports is configurable as a data port or a stacking port, and wherein a networking device in the networking devices is configured to:
receive an instruction that designates the networking device as a master in the networking devices, wherein the networking device has at least a connection via a configurable port in the configurable ports to one or more of remaining networking devices in the networking devices;
provide, in response to the instruction, one or more probe messages to determine a state of the networking devices, wherein the state comprises one or more connections among the networking devices, and wherein the probe messages comprise an identifier of a first of the networking devices and an output port of the first of the networking devices from which the probe message was sent;
verify, based at least in part on the determined state, the one or more connections are correct, wherein verifying the one or more connections are correct comprises determining that each of the one or more network devices has at least a given connection in the one or more connections;
selectively and automatically define a subset of the configurable ports in the networking devices as stacking ports when each of the one or more network devices has at least the given connection in the one or more connections, wherein the automatic definition comprises zero-touch provisioning without operator action; and
define, based at least in part on the verification, a remainder of the configurable ports in the networking devices as data ports.

2. The electronic device of claim 1, wherein at least one configurable port on each of the networking devices is configured as a stacking port.

3. The electronic device of claim 1, wherein, when the one or more connections are not verified as correct, the networking device is configured to provide a message that indicates or specifies that the one or more connections are incorrect.

4. The electronic device of claim 1, wherein the networking device is configured to determine a topology of the networking devices based at least in part on the one or more connections.

5. The electronic device of claim 4, wherein the topology comprises a linear topology or a ring topology.

6. The electronic device of claim 1, wherein the networking devices comprise a switch or a router.

7. A non-transitory computer-readable storage medium for use in conjunction with an electronic device that comprises networking devices arranged in a stack, wherein a given networking device comprises a data plane configured to direct packets or frames in a network based at least in part on destinations of the packets or frames, a control plane configured to provide management and an internal switching fabric for the networking devices, and configurable ports, and wherein a given configurable port in the configurable ports is configurable as a data port or a stacking port, the computer-readable storage medium storing program instructions that, when executed by a networking device in the networking devices, causes the networking device to perform operations comprising:
receiving an instruction that designates the networking device as a master in the networking devices, wherein the networking device has at least a connection via a configurable port in the configurable ports to one or more of remaining networking devices in the networking devices;
providing, in response to the instruction, one or more probe messages to determine a state of the networking devices, wherein the state comprises one or more connections among the networking devices, and wherein the probe messages comprise an identifier of a first of the networking devices and an output port of the first of the networking devices from which the probe message was sent;
verifying, based at least in part on the determined state, the one or more connections are correct, wherein verifying the one or more connections are correct comprises determining that each of the one or more network devices has at least a given connection in the one or more connections;
selectively and automatically defining a subset of the configurable ports in the networking devices as stacking ports when each of the one or more network devices has at least the given connection in the one or more connections, wherein the automatic definition comprises zero-touch provisioning without operator action; and
defining, based at least in part on the verification, a remainder of the configurable ports in the networking devices as data ports.

8. The non-transitory computer-readable storage medium of claim 7, wherein at least one configurable port on each of the networking devices is configured as a stacking port.

9. The non-transitory computer-readable storage medium of claim 7, wherein, when the one or more connections are not verified as correct, the operations comprise providing a message that indicates or specifies that the one or more connections are incorrect.

10. The non-transitory computer-readable storage medium of claim 7, wherein operations comprise determining a topology of the networking devices based at least in part on the one or more connections.

11. The non-transitory computer-readable storage medium of claim 10, wherein the topology comprises a linear topology or a ring topology.

12. The non-transitory computer-readable storage medium of claim 7, wherein the networking devices comprise a switch or a router.

13. A method for performing zero-touch provisioning, comprising:
by a networking device in networking devices arranged in a stack, wherein a given networking device comprises a data plane configured to direct packets or frames in a network based at least in part on destinations of the packets or frames, a control plane configured to provide management and an internal switching fabric for the networking devices, and configurable ports, and wherein a given configurable port in the configurable ports is configurable as a data port or a stacking port:

receiving an instruction that designates the networking device as a master in the networking devices, wherein the networking device has at least a connection via a configurable port in the configurable ports to one or more of remaining networking devices in the networking devices;

providing, in response to the instruction, one or more probe messages to determine a state of the networking devices, wherein the state comprises one or more connections among the networking devices, and wherein the probe messages comprise an identifier of a first of the networking devices and an output port of the first of the networking devices from which the probe message was sent;

verifying, based at least in part on the determined state, the one or more connections are correct, wherein verifying the one or more connections are correct comprises determining that each of the one or more network devices has at least a given connection in the one or more connections;

selectively and automatically defining a subset of the configurable ports in the networking devices as stacking ports when each of the one or more network devices has at least the given connection in the one or more connections, wherein the automatic definition comprises zero-touch provisioning without operator action; and defining, based at least in part on the verification, a remainder of the configurable ports in the networking devices as data ports.

14. The method of claim 13, wherein at least one configurable port on each of the networking devices is configured as a stacking port.

15. The method of claim 13, wherein, when the one or more connections are not verified as correct, the method comprises providing a message that indicates or specifies that the one or more connections are incorrect.

16. The method of claim 13, wherein the networking device is configured to determine a topology of the networking devices based at least in part on the one or more connections.

17. The method of claim 13, wherein the networking devices comprise a switch or a router.

* * * * *

UNITED STATES PATENT AND TRADEMARK OFFICE
CERTIFICATE OF CORRECTION

PATENT NO. : 11,979,283 B2
APPLICATION NO. : 17/124799
DATED : May 7, 2024
INVENTOR(S) : Lin et al.

Page 1 of 1

It is certified that error appears in the above-identified patent and that said Letters Patent is hereby corrected as shown below:

On the Title Page

(73) Assignee: Please correct "Rvckus IP Holdings LLC, Claremont, NC (US)" to read --Ruckus IP Holdings LLC, Claremont, NC (US)--

Signed and Sealed this
Twelfth Day of November, 2024

Katherine Kelly Vidal
*Director of the United States Patent and Trademark Office*